United States Patent
Sperry et al.

(10) Patent No.: US 9,034,237 B2
(45) Date of Patent: May 19, 2015

(54) SOLID IMAGING SYSTEMS, COMPONENTS THEREOF, AND METHODS OF SOLID IMAGING

(71) Applicant: 3D Systems, Inc., Rock Hill, SC (US)

(72) Inventors: Charles R. Sperry, Leeds, MA (US); Dennis F. McNamara, Walpole, NH (US); Martin Alan Johnson, Rock Hill, SC (US); Richard Ora Gregory, II, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 134 days.

(21) Appl. No.: 13/625,946

(22) Filed: Sep. 25, 2012

(65) Prior Publication Data

US 2014/0084517 A1   Mar. 27, 2014

(51) Int. Cl.
    *B29C 67/00*   (2006.01)
(52) U.S. Cl.
    CPC .................................. *B29C 67/0077* (2013.01)
(58) Field of Classification Search
    CPC ..................... B29C 67/0077; B29C 67/0085
    USPC .................................................. 425/218, 219
    See application file for complete search history.

(56) References Cited

U.S. PATENT DOCUMENTS

| | | | |
|---|---|---|---|
| 4,752,498 A | 6/1988 | Fudim | |
| 5,014,207 A | 5/1991 | Lawton | |
| 5,049,901 A | 9/1991 | Gelbart | |
| 5,094,935 A | 3/1992 | Vassiliou et al. | |
| 5,096,530 A | 3/1992 | Cohen | |
| 5,122,441 A | 6/1992 | Lawton et al. | |
| 5,132,723 A | 7/1992 | Gelbart | |
| 5,143,817 A | 9/1992 | Lawton et al. | |
| 5,158,858 A | 10/1992 | Lawton et al. | |
| 5,169,579 A | 12/1992 | Marcus et al. | |
| 5,171,490 A | 12/1992 | Fudim | |
| 5,192,559 A | 3/1993 | Hull et al. | |

(Continued)

FOREIGN PATENT DOCUMENTS

| | | |
|---|---|---|
| DE | 19957370 | 11/1999 |
| DE | 10119817 | 10/2002 |

(Continued)

OTHER PUBLICATIONS

English Translation of DE 19957370A1.

(Continued)

*Primary Examiner* — Alison Hindenlang

(57) ABSTRACT

There is provided solid imaging methods and apparatus for making three-dimensional objects from solid imaging material. A tray with a film bottom is provided to hold solid imaging material that is selectively cured into cross-sections of the three-dimensional object being built. A coater bar is moved back and forth over the film to remove any uncured solid imaging material from a previous layer and to apply a new layer of solid imaging material. A sensor is provided to measure the amount of resin in the tray to determine the appropriate amount of solid imaging material to be added, from a cartridge, for the next layer. A shuttle, which covers the tray when the exterior door to the solid imaging apparatus is opened for setting up a build or removing a three-dimensional object, can also be used to move the coater bar and to selectively open one or more valves on the cartridge to dispense the desired amount of solid imaging material.

12 Claims, 15 Drawing Sheets

(56) References Cited

U.S. PATENT DOCUMENTS

| | | | |
|---|---|---|---|
| 5,236,812 A | 8/1993 | Vassiliou et al. | |
| 5,247,180 A | 9/1993 | Mitcham et al. | |
| 5,306,446 A | 4/1994 | Howe | |
| 5,352,310 A | 10/1994 | Natter | |
| 5,391,072 A | 2/1995 | Lawton et al. | |
| 5,429,908 A | 7/1995 | Hokuf et al. | |
| 5,447,822 A | 9/1995 | Hull et al. | |
| 5,474,719 A | 12/1995 | Fan et al. | |
| 5,529,473 A | 6/1996 | Lawton et al. | |
| 5,650,260 A | 7/1997 | Onishi | |
| 5,695,708 A | 12/1997 | Karp et al. | |
| 5,730,925 A * | 3/1998 | Mattes et al. | 264/497 |
| 6,051,179 A | 4/2000 | Hagenau | |
| 6,132,667 A | 10/2000 | Beers et al. | |
| 6,174,156 B1 | 1/2001 | Chapman et al. | |
| 6,206,672 B1 | 3/2001 | Grenda | |
| 6,391,245 B1 | 5/2002 | Smith | |
| 6,500,378 B1 | 12/2002 | Smith | |
| 6,547,552 B1 | 4/2003 | Fudim | |
| 6,571,986 B1 | 6/2003 | Simmons | |
| 6,641,772 B2 | 11/2003 | Gelbart | |
| 6,665,048 B2 | 12/2003 | Gelbart | |
| 6,733,267 B2 | 5/2004 | Champman et al. | |
| 6,780,368 B2 | 8/2004 | Liu et al. | |
| 6,792,327 B1 | 9/2004 | Bamford | |
| 6,824,714 B1 | 11/2004 | Turck et al. | |
| 6,932,935 B1 | 8/2005 | Oberhofer et al. | |
| 6,942,830 B2 | 9/2005 | Mulhaupt et al. | |
| 6,965,364 B1 | 11/2005 | Eggers et al. | |
| 7,048,530 B2 * | 5/2006 | Gaillard et al. | 425/258 |
| 7,052,263 B2 | 5/2006 | John | |
| 7,090,484 B2 | 8/2006 | Ueno | |
| 7,128,866 B1 | 10/2006 | Henningsen | |
| 7,158,849 B2 | 1/2007 | Huang et al. | |
| 7,195,472 B2 | 3/2007 | John | |
| 7,261,542 B2 | 8/2007 | Hickerson et al. | |
| 7,291,002 B2 | 11/2007 | Russell et al. | |
| 7,358,283 B2 | 4/2008 | Xu | |
| 7,438,846 B2 | 10/2008 | John | |
| 7,467,939 B2 | 12/2008 | Sperry et al. | |
| 7,614,866 B2 | 11/2009 | Sperry et al. | |
| 7,636,610 B2 | 12/2009 | Schillen | |
| 7,706,910 B2 | 4/2010 | Hull et al. | |
| 7,731,887 B2 | 6/2010 | Hull | |
| 7,758,799 B2 | 7/2010 | Hull et al. | |
| 7,771,183 B2 | 8/2010 | Hull et al. | |
| 7,783,371 B2 | 8/2010 | John | |
| 7,790,093 B2 | 9/2010 | Shkolnik et al. | |
| 7,831,328 B2 | 11/2010 | Schillen et al. | |
| 7,845,930 B2 | 12/2010 | Shkolnik et al. | |
| 7,879,393 B2 * | 2/2011 | Ederer et al. | 427/203 |
| 7,892,474 B2 | 2/2011 | Shkolnik et al. | |
| 7,894,921 B2 | 2/2011 | John et al. | |
| 7,906,061 B2 | 3/2011 | Partanen et al. | |
| 7,931,460 B2 | 4/2011 | Scott et al. | |
| 7,962,238 B2 | 6/2011 | Shkolnik et al. | |
| 8,003,039 B2 | 8/2011 | Sperry | |
| 8,003,040 B2 | 8/2011 | El-Siblani | |
| 8,105,066 B2 | 1/2012 | Sperry | |
| 8,110,135 B2 | 2/2012 | El-Siblani | |
| 8,126,580 B2 | 2/2012 | El-Siblani et al. | |
| 8,221,671 B2 | 7/2012 | Hull | |
| 2003/0021823 A1 | 1/2003 | Landers et al. | |
| 2004/0173946 A1 | 9/2004 | Pfeifer et al. | |
| 2006/0192312 A1 | 8/2006 | Wahlstrom | |
| 2008/0054531 A1 | 3/2008 | Kerekes et al. | |
| 2008/0170112 A1 | 7/2008 | Hull et al. | |
| 2008/0181977 A1 | 7/2008 | Sperry et al. | |
| 2008/0226346 A1 | 9/2008 | Hull et al. | |
| 2009/0020901 A1 | 1/2009 | Schillen | |
| 2009/0110763 A1 | 4/2009 | Sperry et al. | |
| 2010/0125356 A1 | 5/2010 | Shkolnik et al. | |
| 2010/0262272 A1 | 10/2010 | Shkolnik et al. | |
| 2011/0062633 A1 | 3/2011 | Shkolnik et al. | |
| 2011/0089610 A1 | 4/2011 | El-Siblani et al. | |
| 2011/0101570 A1 | 5/2011 | John et al. | |
| 2011/0196529 A1 | 8/2011 | Shkolnik et al. | |
| 2011/0260365 A1 | 10/2011 | El-Siblani et al. | |
| 2012/0195994 A1 | 8/2012 | El-Siblani et al. | |

FOREIGN PATENT DOCUMENTS

| | | |
|---|---|---|
| DE | 10256672 | 6/2004 |
| DE | 102009007116 | 5/2010 |
| EP | 0322257 | 6/1989 |
| EP | 0414215 | 2/1991 |
| EP | 0470705 | 2/1992 |
| EP | 0676275 | 10/1995 |
| EP | 549993 | 3/1997 |
| EP | 1274559 | 7/2000 |
| EP | 1253002 | 10/2002 |
| EP | 1439051 | 7/2004 |
| EP | 1439052 | 7/2004 |
| EP | 1250997 | 11/2005 |
| EP | 1600282 | 11/2005 |
| EP | 1864785 | 2/2007 |
| EP | 1946907 | 7/2008 |
| EP | 1946911 | 7/2008 |
| JP | 2002370286 | 12/2002 |
| JP | 6039928 | 12/2007 |
| WO | 9631403 | 10/1996 |
| WO | 01/40866 | 6/2001 |
| WO | WO0236331 | 5/2002 |
| WO | 2004044816 | 5/2004 |
| WO | WO2006109425 | 10/2006 |
| WO | 2008088637 | 7/2008 |

OTHER PUBLICATIONS

PCT Search Report for International Application No. PCT/US2007/087715.

PCT Search Report for International Application No. PCT/US2007/087716.

PCT Search Report for International Application No. PCT/US2007/087718.

PCT Search Report for International Application No. PCT/US2007/087720.

PCT Communication Relating to the Results of the Partial International Search for PCT International Application No. PCT/US2012/057012 (6 pages).

PCT Written Opinion of the International Searching Authority for PCT International Application No. PCT/US2012/057012, mailed Apr. 10, 2014 (14 pages).

PCT International Search Report for International Application No. PCT/US2012/057012, filed Sep. 25, 2012 (7 pages).

PCT Written Opinion of the International Searching Authority for International Application No. PCT/US2012/057012, filed Sep. 25, 2012 (13 pages).

Extended European Search Report mailed Jul. 1, 2014 (3 pages).

Extended European Search Report mailed Aug. 11, 2014 (6 pages).

* cited by examiner

SOLID IMAGING SYSTEMS, COMPONENTS THEREOF, AND METHODS OF SOLID IMAGING

FIELD OF THE INVENTION

The present invention is related to solid imaging systems, and more particularly, to apparatus and methods for providing and selectively curing layers of solid imaging material into a three-dimensional object.

BACKGROUND OF THE INVENTION

Solid imaging systems typically create three-dimensional objects based upon computer data by forming sequential layers of material into cross-sectional patterns that are combined along a z-axis to form a three-dimensional object. Solid imaging systems include systems that build parts by one or more of the following techniques: stereolithography, laser sintering, fused deposition modeling, selective deposition modeling, film transfer imaging, and others.

Certain solid imaging systems provide solid imaging material in a trough with an actinic radiation transparent bottom through which actinic radiation can be projected to cure cross-sectional patterns of the three-dimensional object onto the photosensitive solid imaging material, thereby curing the material. A build pad and/or platform is vertically movable above the trough, and the three-dimensional object is typically supported by the build pad or platform such that the three-dimensional objects are generally built in an upside down manner. Examples of such solid imaging techniques and similar techniques are disclosed in U.S. Pat. Nos. 4,575,330; 5,391,072; 5,447,822; 5,545,367; 7,052,263; 7,614,866; 7,706,910; 7,845,930; and 8,003,040 and U.S. Patent Application Publication No. 2001/0048183, all of the disclosures of which are hereby incorporated by reference in their entireties.

BRIEF SUMMARY OF THE INVENTION

The various embodiments of the present invention provide significant improvements over the solid imaging systems described above. Embodiments of the present invention provide a controlled layer thickness of uncured solid imaging material within a tray having a flexible, radiation-transparent bottom film by the use of a coater bar. The coater bar removes uncured solid imaging material (as well as any cured solid imaging material that did not adhere to the build pad or previously cured layer of the three-dimensional object) from a previous layer as the coater bar moves in a first direction and then supplies a new layer of uncured solid imaging material as the coater bar moves in a second direction that is generally opposite the first direction. For example, after a layer of solid imaging material is selectively cured and adhered to previous layers of the object being built, the build platform raises the object a predetermined amount in the z-axis direction so that the coater bar may move in the x-axis direction to push away a substantial amount, and preferably all, of the remaining uncured solid imaging material. The coater bar is then moved along the x-axis in an opposite direction and applies a new layer of uncured solid imaging material. The coater bar is preferably moved from a first scraping position to a second layering position, such as by pivoting, rotating, lifting, or otherwise moving the coater bar, after the first movement of the coater bar (to push away uncured solid imaging material) and before the second movement of the coater bar (to apply a new layer of uncured solid imaging material). After the new layer of uncured solid imaging material has been applied, the build platform lowers the three-dimensional object being produced back down toward the image plane at least until the most-recently cured layer is in contact with the newly applied layer of uncured solid imaging material, and then the imager selectively cures the newly applied layer and the process is repeated until the three-dimensional object is complete.

Certain embodiments of the present invention include a resin sensor positioned below the radiation-transparent bottom film and that detects the presence and thickness of the resin layer above the sensor by sending an optical signal, or other detectable signal, that reflects back to the sensor. Based upon the measured presence and/or thickness of the resin above the sensor, a controller for the solid imaging apparatus determines the amount of new solid imaging material that should be supplied to the tray. Some embodiments of the present invention position the cartridge above the tray and include selectively openable valves that are opened a certain amount of time to dispense a desired amount of solid imaging material into the tray. Once the desired amount of solid imaging material has been supplied to the tray, the coater bar is then moved over the film (to scrape/push the uncured solid imaging material of the previous layer and push at least some of the newly dispensed solid imaging material) and back (to apply the new layer of solid imaging material).

Some embodiments of the present invention have a shuttle that moves along the x-axis to selectively cover the tray. The shuttle can cover the tray after a build process is complete and the user is ready to open the solid imaging apparatus to remove the three-dimensional object. By closing the shuttle over the tray, the solid imaging material in the tray is not exposed to actinic radiation from outside the solid imaging apparatus, thereby preventing any undesirable curing of solid imaging material that can therefore be used in subsequent build processes. Additional embodiments connect the coater bar to one end of the shuttle so that the shuttle can be closed and opened between curing steps to move the coater bar back and forth along the x-axis. The shuttle in some embodiments has a spring device that connects the coater bar to the shuttle so that the coater bar is pressed against the film by a predetermined force to ensure proper removal of uncured solid imaging material and/or to provide a desired layer thickness of material when applying a new layer of solid imaging material. The coater bar of certain embodiments of the present invention is pivotably connected to the shuttle so that the coater bar pivots from the first scraping position to a second layering position, after the first movement of the coater bar (to push away uncured solid imaging material) and before the second movement of the coater bar (to apply a new layer of uncured solid imaging material) and pivots back to the first scraping position prior to pushing away uncured solid imaging material from the previously applied new layer of uncured solid imaging material. The layer thickness of the new layer of uncured solid imaging material can be controlled by the amount of downward force applied to the coater bar and/or by the speed by which the coater bar is moved during the second movement. Still further embodiments of the present invention control the layer thickness by providing certain geometries of the coater bar and/or rake angle of the coater bar.

Further embodiments of the present invention provide solid imaging material to the tray from a removable cartridge that includes at least one selectively openable valve. In some embodiments, the shuttle includes a valve-opening device that may be pressed against the selectively openable valve to cause solid imaging material to dispense from the cartridge into the tray. The shuttle may include an opening proximate the valve-opening device that allows the solid imaging material to fall through the shuttle and into the tray. In some embodiments, the solid imaging material is deposited on or near the coater bar connected to the shuttle so that after the solid imaging material has been dispensed onto the tray, when the shuttle moves in the x-axis direction to move the coater bar in the first movement to push away uncured solid imaging material, the coater bar also pushes the newly deposited solid imaging material generally to the other side of the tray from where the solid imaging material was deposited. This supply of new and scraped solid imaging material that is combined or mixed together flows under and/or over the coater bar and is then moved by the coater bar in the second movement to supply the new layer of solid imaging material. After the new layer is selectively cured by the projected image(s) of (or other actinic radiation from) the imager, the process of measuring the amount of solid imaging material remaining in the tray and depositing new solid imaging material onto the tray, scraping uncured solid imaging material, and applying a layer of new solid imaging material is repeated until the three-dimensional object is complete.

Still further embodiments of the present invention include additional features such as techniques for removing and installing the cartridge, tray, and/or coater bar. The cartridge may include one or more mixing bails inside the cartridge that cause the solid imaging material to be mixed when the cartridge is shaken by the operator prior to the operator installing the cartridge in the solid imaging apparatus. The cartridge is inserted into a slot that aligns the cartridge so that the selectively openable valve(s) is positioned proximate the valve-opening device of the shuttle and so that an RFID tag or other identification device on the cartridge can be communicated with by the solid imaging apparatus to confirm that the solid imaging material in the cartridge is the proper material, is not expired, and does not present other problems for the production of three-dimensional objects. The slot into which the cartridge is inserted incorporates a load cell in certain embodiments of the invention in order to determine the weight of the cartridge (based upon the remaining amount of solid imaging material within the cartridge) in order to ensure that the cartridge can provide sufficient solid imaging material to complete an uninterrupted build process and to determine the head pressure of the solid imaging material being dispensed from the selectively openable valve(s) so that the controller of the solid imaging apparatus can determine the amount of solid imaging material dispensed during the time period that the valve-opening device (connected to the shuttle, connected to a different device, or not connected to another device) opens the selectively openable valve(s). Still further embodiments of the present invention determine the remaining amount of solid imaging material within the cartridge using alternative devices or techniques, such as the use of proximity sensor(s) to detect fluid level, ultrasonic sensors for detecting fluid level, and mechanical devices such as floats and dipsticks.

Because the film of the tray is flexible to assist in the separation of the cured layer from the film, over a period of time the film may need to be replaced by replacing the entire tray. The frame of the solid imaging apparatus of some embodiments is selectively openable by the operator to allow a used tray to be removed and a new tray to be inserted and clamped down by the frame in the desired location. Because some embodiments of the present invention supply an amount of air between the bottom of the film and the glass or other radiation transparent surface that the film is supported by in order to assist the film in raising and enabling the cured layer to be removed from the film with less force (as compared to there being no air supplied below the film), the frame includes a gasket that the bottom surface of the tray rests upon that ensures an airtight seal between the bottom of the film and the support surface below. After the cured layer of solid imaging material connected to (and part of) the three-dimensional object being made is separated from the film, some embodiments of the present invention provide a negative air pressure between the film and support surface to remove the air therebetween. The positive and negative air pressures described herein can be provided with any air pressure control device, such as a pump, known to a person skilled in the art. The negative air pressure is typically applied, in some embodiments of the present invention, while the coater bar is moving in the first movement and/or second movement so that the downward pressure applied by the coater bar on the film helps to push any trapped pockets of air to the opening through which the negative air pressure is applied. Certain embodiments of the present invention control the lifting force for separating the cured layer from the film with the amount and/or duration of pressurized air applied under the film (or vice versa), and still further embodiments analyze the cross-sectional area of the cured layer being separated from the film to determine a preferred lift force and/or pressurized air amount and/or duration. Whereas some embodiments of the present invention apply a standard lifting force to raise the cured layer out of the tray and a standard amount and/or duration of pressurized air to assist in the separation of the cured layer from the film of the tray, alternative embodiments provide different amounts of lifting force and/or pressurized air amounts and/or duration based upon based upon analyses of the cross-sectional area of the cured layer, the weight of the partially completed three-dimensional object connected to the build pad, and other parameters.

Still further embodiments of the present invention include techniques for measuring the intensity profile of the image (either the entire image or select portions of the image) projected from the imager. Such measurement devices and techniques are disclosed in U.S. Patent Application Publication No. 2010/0098835 which is incorporated herein in its entirety by reference. Additional embodiments include an imager shutter that may be selectively positioned in the path of the image projected by the imager. The imager shutter of certain embodiments includes an actinic radiation sensor that measures the intensity of the image being projected, and include in further embodiments a diffuser to reduce the amount of radiation that reaches the actinic radiation sensor to prevent flooding of the sensor or other situations that would diminish the ability of the actinic radiation sensor to make accurate measurements of the actinic radiation. By undertaking an automatic calibration sequence with the shutter in the path of the image, the sensor is able to determine the intensity profile of the projected image by the imager automatically projected actinic radiation at various locations of the largest possible image and measuring the radiation intensity for each projection. Once the controller has determined the intensity profile of the images projected by the imager, the solid imaging apparatus can adjust the images projected onto the layers of solid imaging material using the techniques disclosed in U.S. Patent Application Publication No. 2010/0098835 and in other ways known to a person of ordinary skill in the art.

Additional embodiments of the present invention include a build pad for supporting the three-dimensional object being built. The build pad is attached to a build platform connected to one or more z-axis motors that vertically raise or lower the build platform. The build pad includes a generally planar surface that faces downward while the build pad is connected to the build platform and that defines the surface to which the three-dimensional object and/or the support structure for the three-dimensional object is adhered during the build process. Between the generally planar surface and the build platform is a generally compressible material that can be compressed in a vertical direction if the build platform moves down to such an extent that the bottom surface of the build pad contacts the film of the tray. By providing a compressible portion of the build pad, certain embodiments of the present invention enable a three-dimensional object to be precisely built upon a build pad that is not perfectly level with the film of the tray (and the support surface beneath the film) because any out-of-level portion of the build pad will be compressed during the first one or more layers of the build process such that no or less material is cured in the area below the compressed portion of the build pad. Those first one or more layers typically include the support structure, so such unintended differences in the amount of material cured do not adversely affect the quality of the three-dimensional object that is supported by the support structures (because the support structures are typically discarded after the build process has finished). Therefore, when a build pad is mounted in a non-parallel manner, the support structures will compensate for the discrepancy prior to the beginning of the formation of the three-dimensional object such that the quality of the three-dimensional object is not diminished by the non-parallel or out-of-level build pad.

Still further embodiments of the present invention incorporate a novel light source for projecting an image onto the layer of solid imaging material. Rather than using a spatial light modulator, digital light projector, or other light source that projects a two-dimensional image that is magnified and/or reflected off mirrors, embodiments of the present invention include a plasma screen positioned directly below the support surface for the film, as the support surface for the film, or as the image plane without any film or tray. The plasma screen of certain embodiments is doped to provide a desired amount of actinic radiation having the preferred wavelength, such as in the UV range, for curing of the solid imaging material. For example, the plasma screen may have filters for UV light removed and/or filters for non-UV light (to provide non-limiting examples of particular actinic radiation) included so that only radiation in the desired range of wavelengths is absorbed by the solid imaging apparatus (for temperature control reasons, material property reasons, and other reasons). The plasma screen may also be doped to provide one or more wavelengths of actinic radiation for curing differently the same solid imaging material. In some embodiments, certain pixels project a first wavelength of actinic radiation to cure the solid imaging material into support structures and project a second wavelength of actinic radiation to cure the same solid imaging material into the desired three-dimensional object. Such support structures have different mechanical or chemical properties suited for improved removal of the support structure from the three-dimensional object. Non-limiting examples of different properties include, but are not limited to, providing support structures with a lower melting temperature than the three-dimensional object, support structures that are dissolvable in a solution that does not dissolve the three-dimensional object, support structures that are softer than the three-dimensional object to enable easier removal by hand or with simple tools, and other support structures that are different than the three-dimensional object.

Still further embodiments of the present invention include other apparatus, methods, features, and properties as described more fully be low.

BRIEF DESCRIPTION OF THE SEVERAL VIEWS OF THE DRAWINGS

Figure 1:
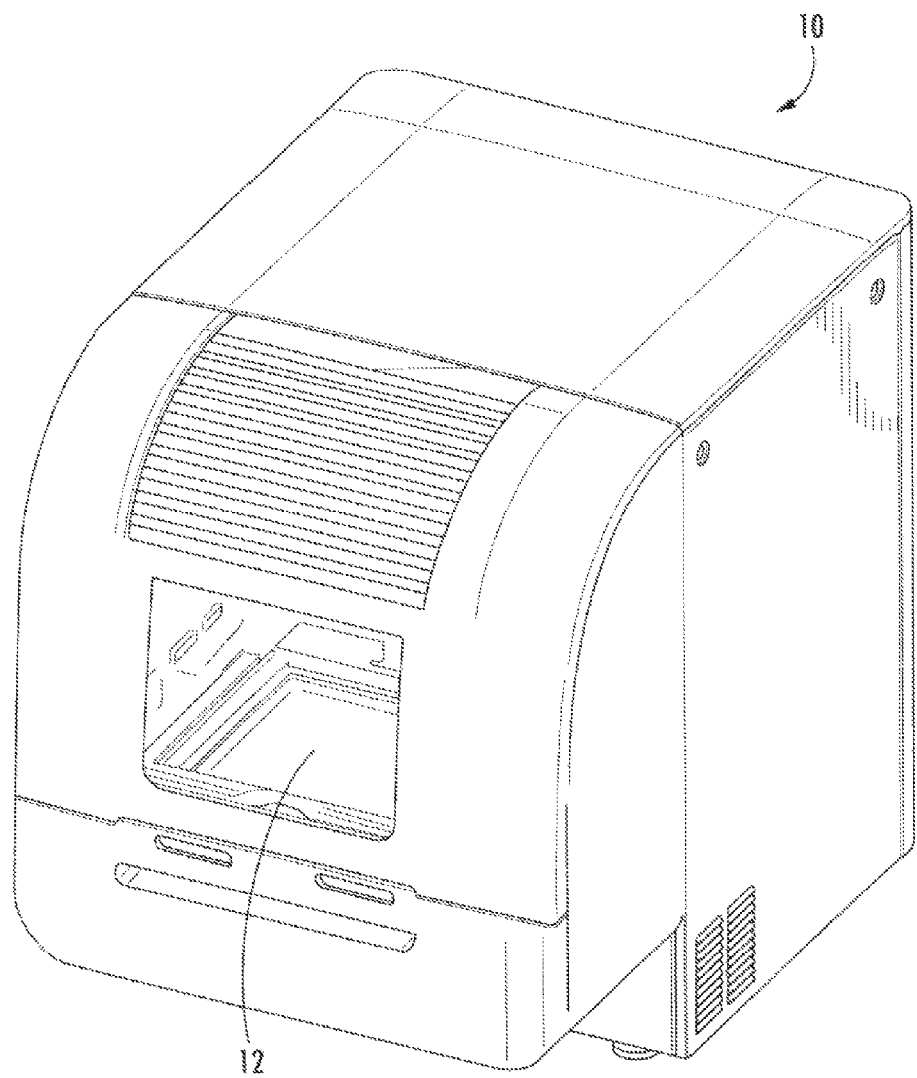
Figure 2:
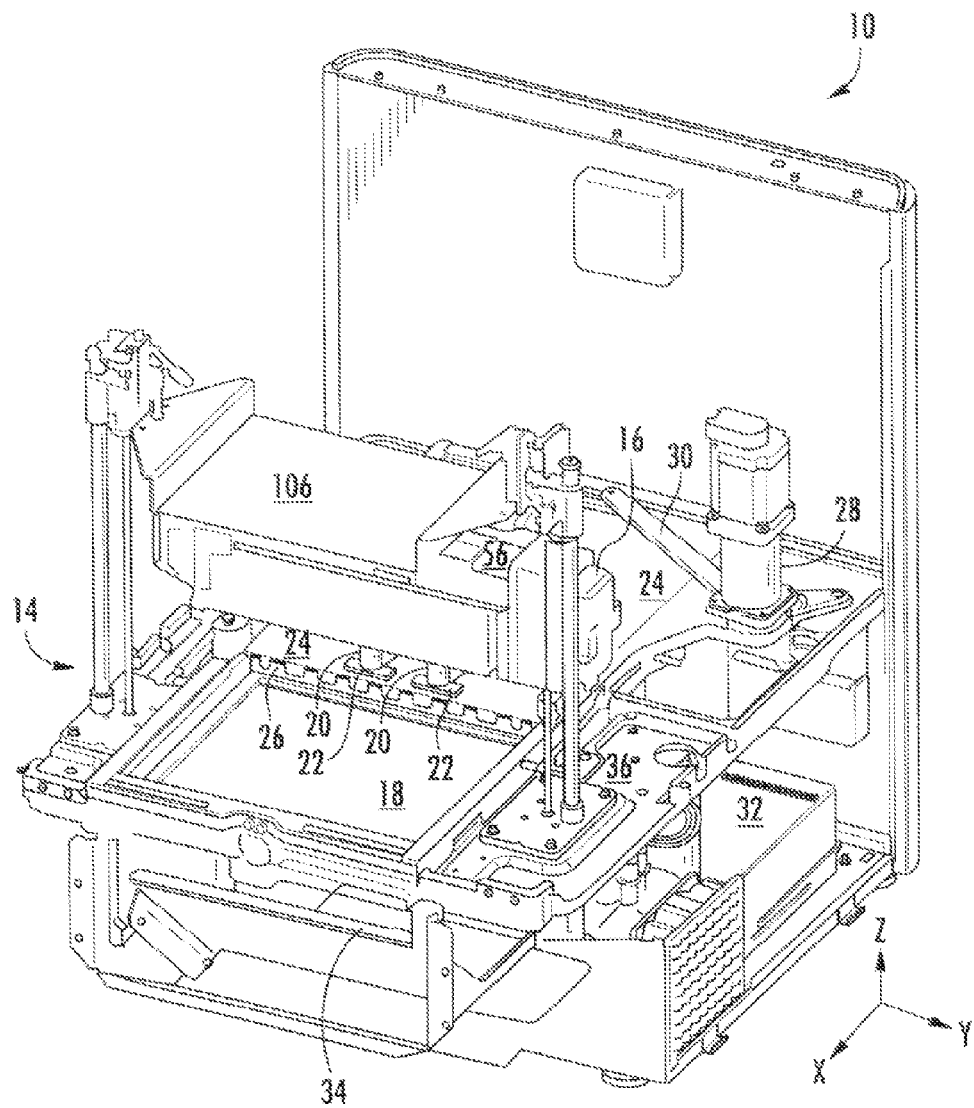
Figure 3A:
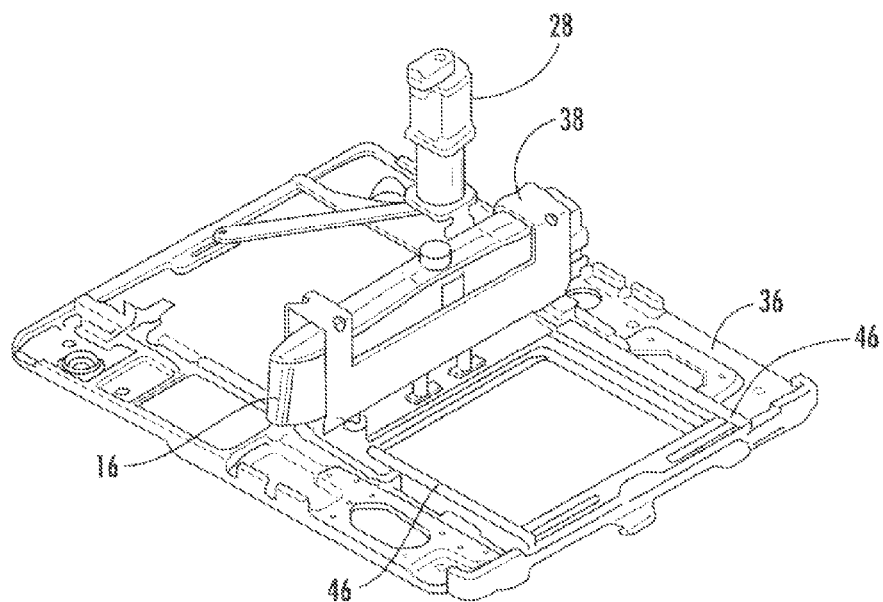
Figure 3B:
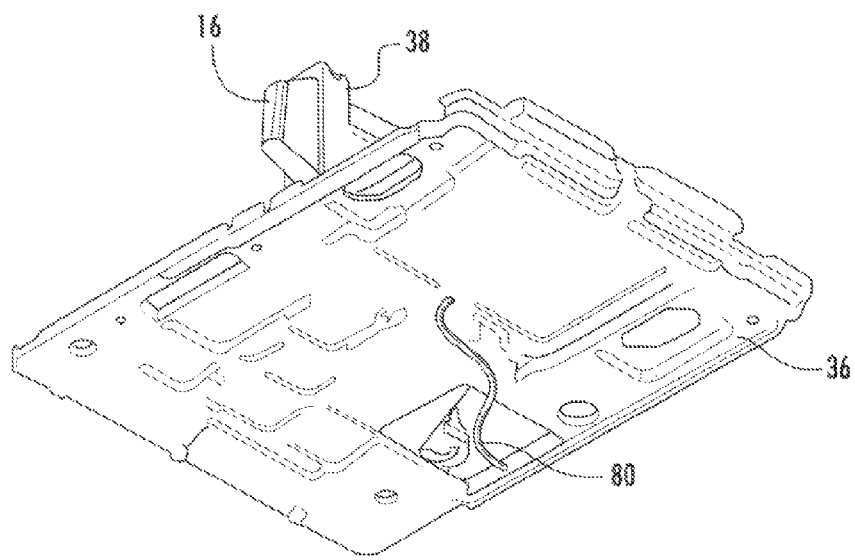
Figure 4:
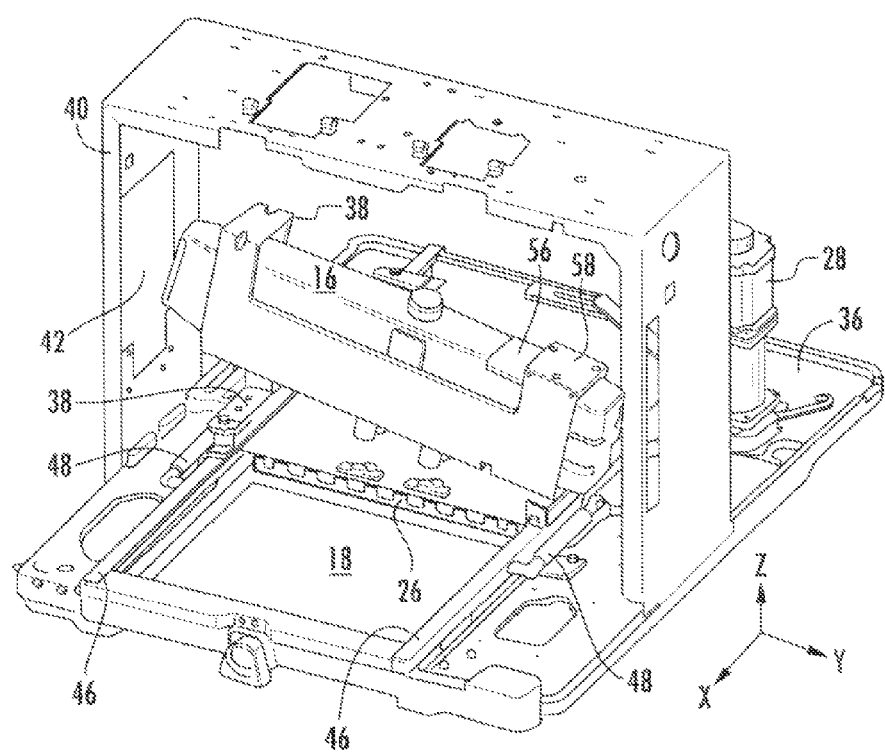
Figure 5A:
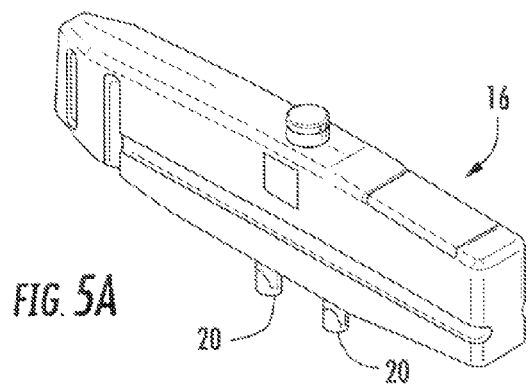
Figure 5B:
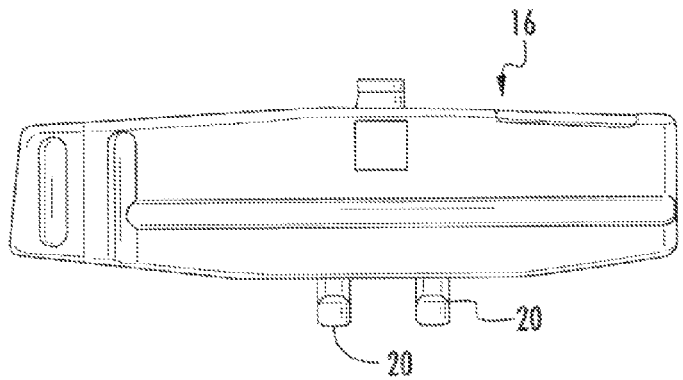
Figure 5C:
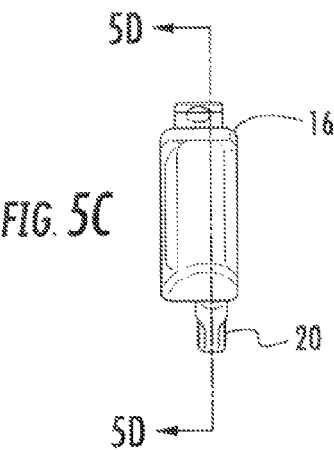
Figure 5D:
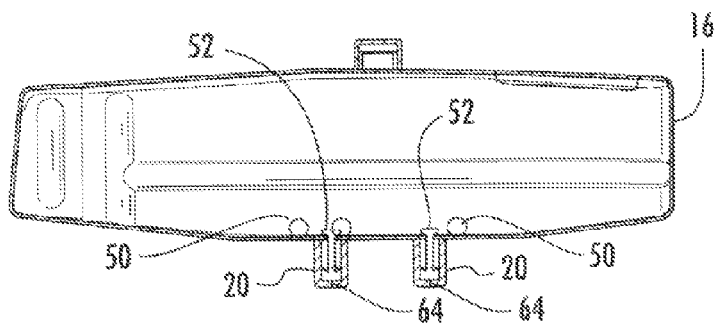
Figure 5E:
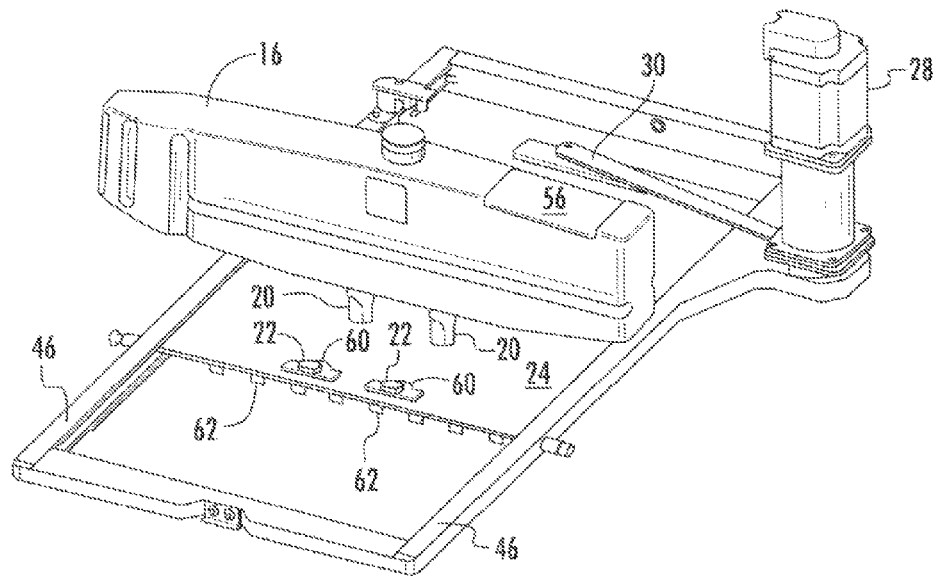
Figure 5F:
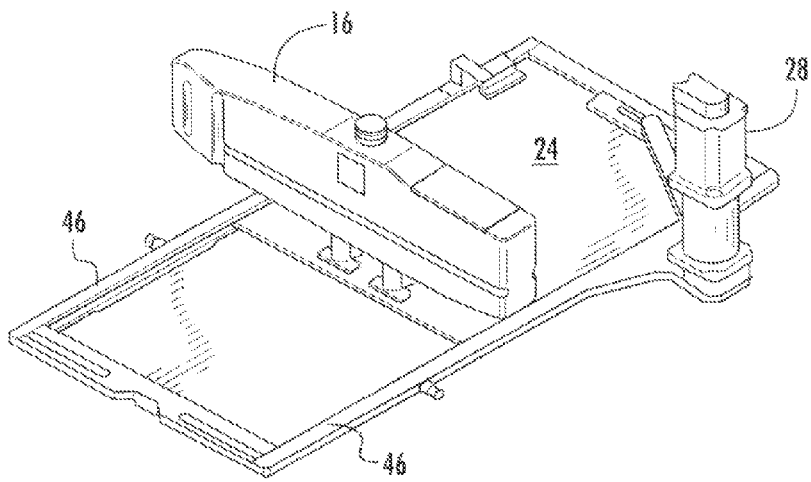
Figure 5G:
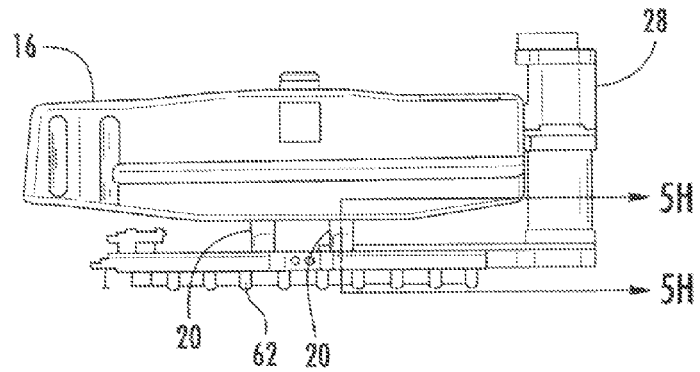
Figure 5H:
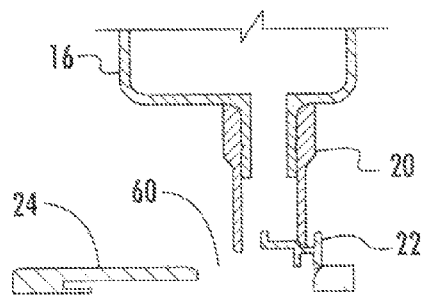
Figure 5I:
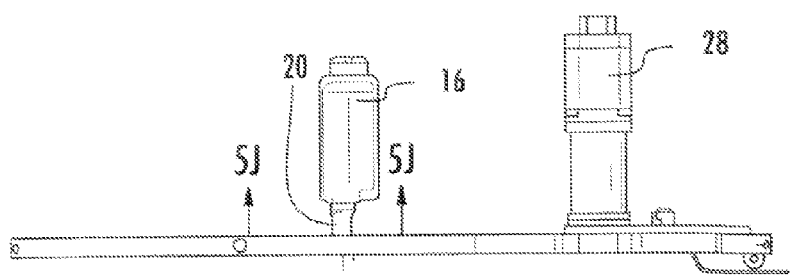
Figure 5J:
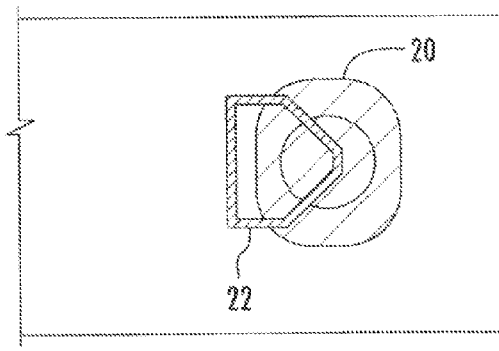
Figures 6A, 6B:
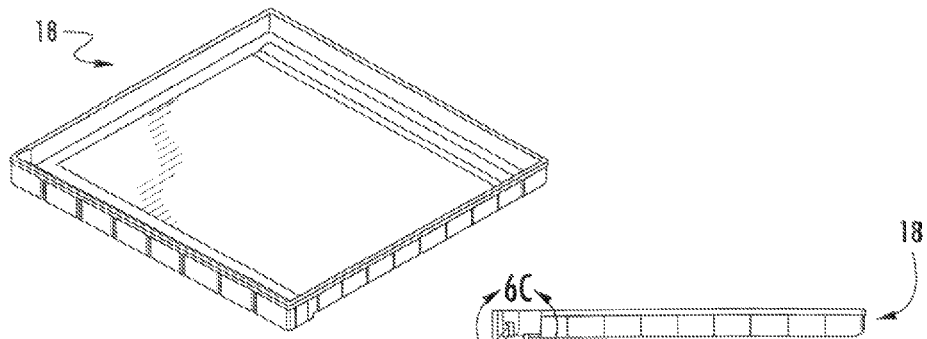
Figure 6C:
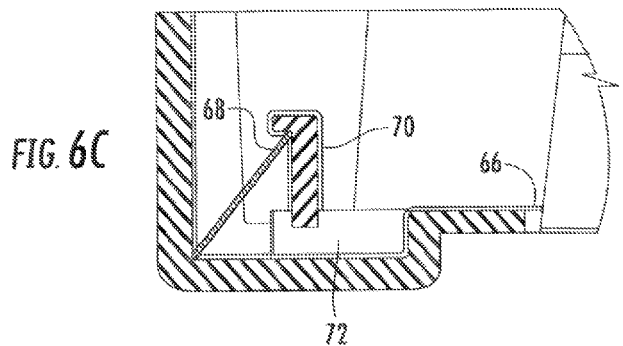
Figures 6D, 6E:
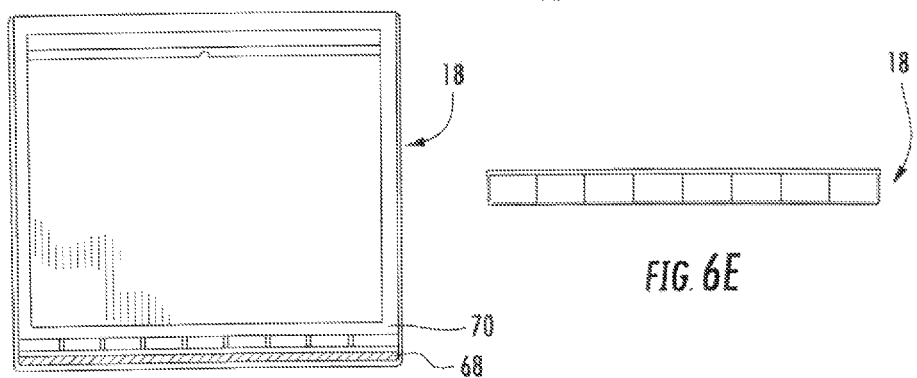
Figure 7:
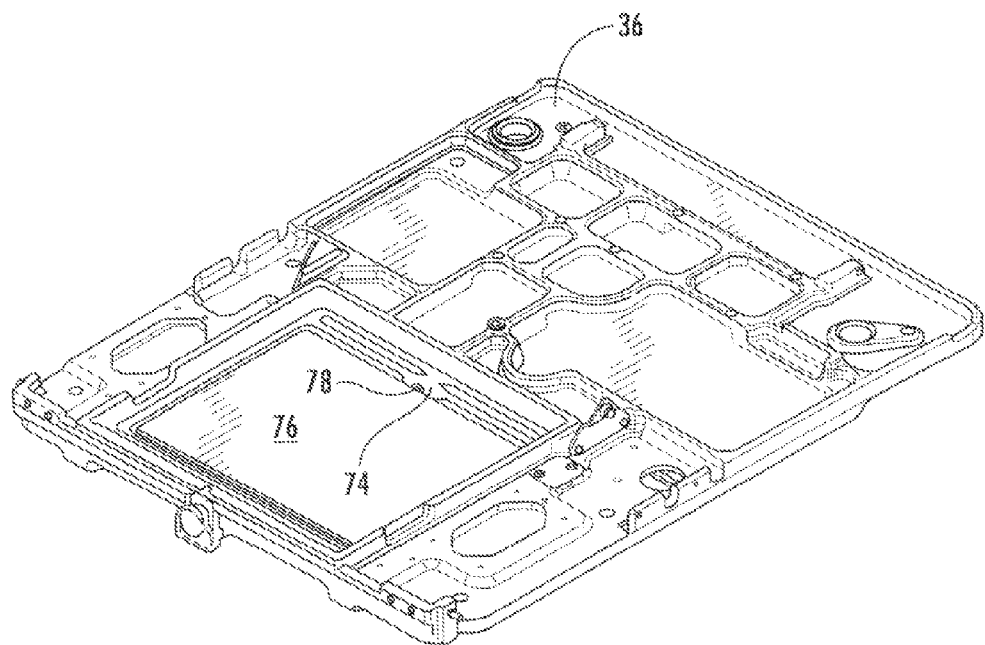
Figure 8A:
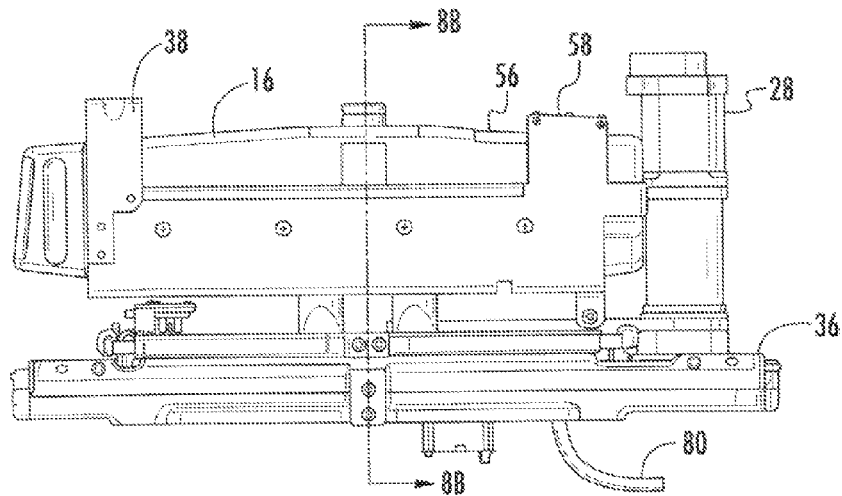
Figure 8B:
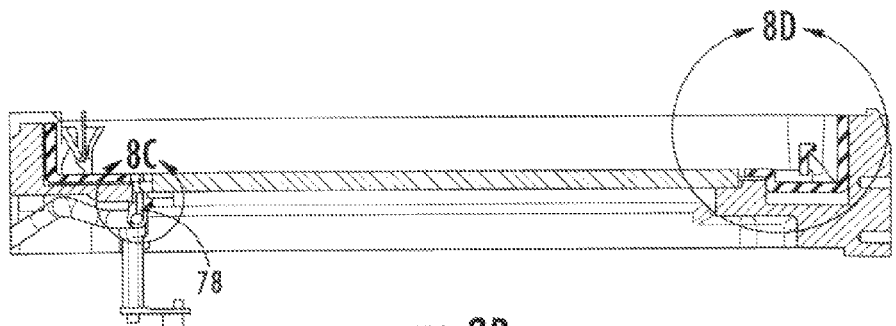
Figure 8C:
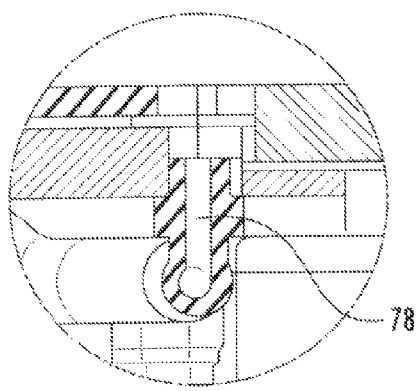
Figure 8D:
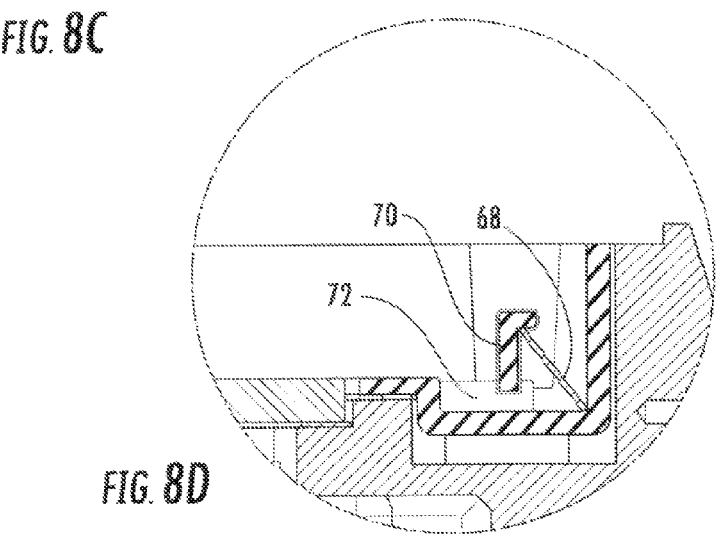
Figure 9A:
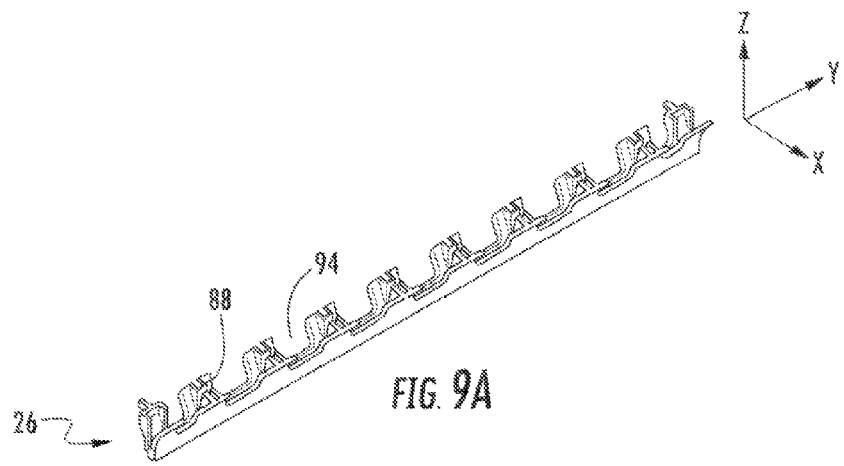
Figure 9B:
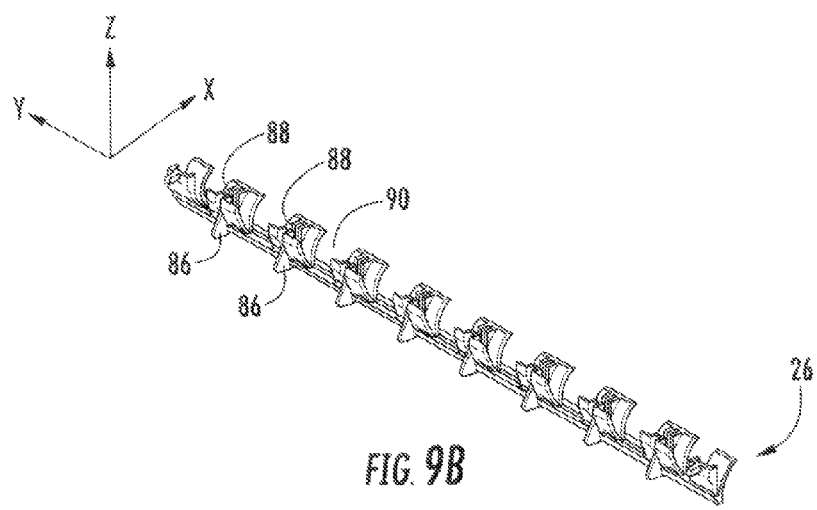
Figure 9C:
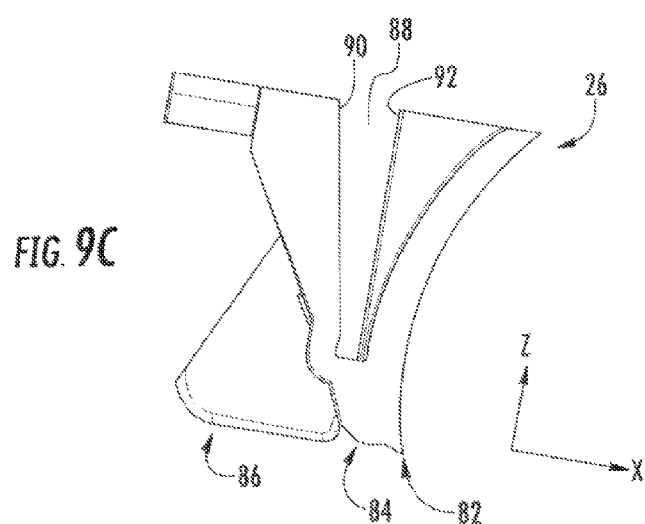
Figure 9D:
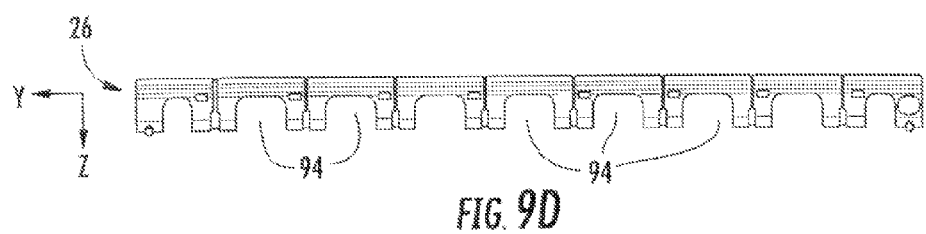
Figure 9E:
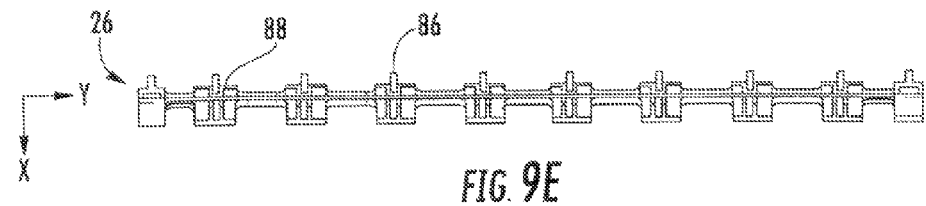
Figures 9F, 9G:
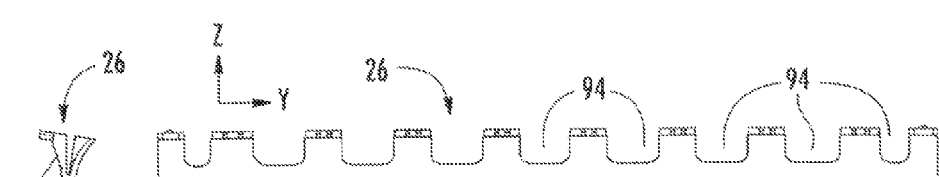
Figure 10A:
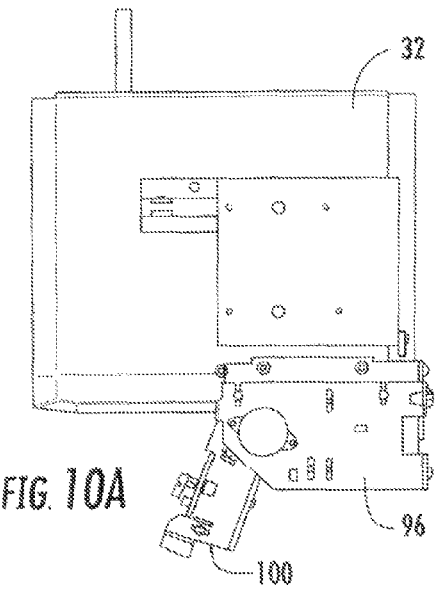
Figure 10C:
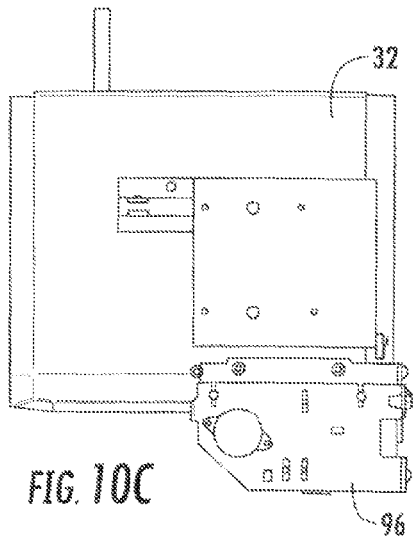
Figure 10B:
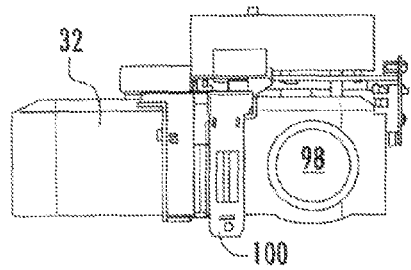
Figure 10D:
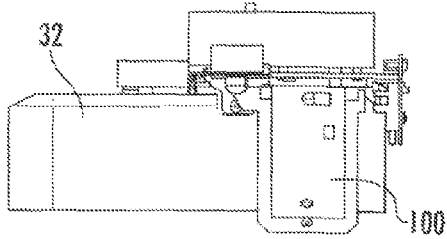
Figure 10E:
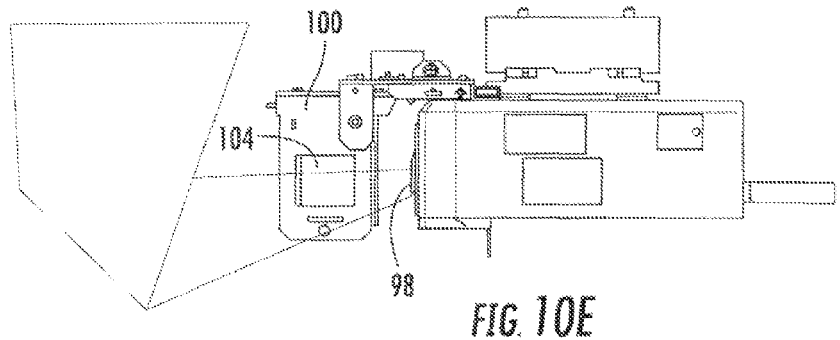
Figure 10F:
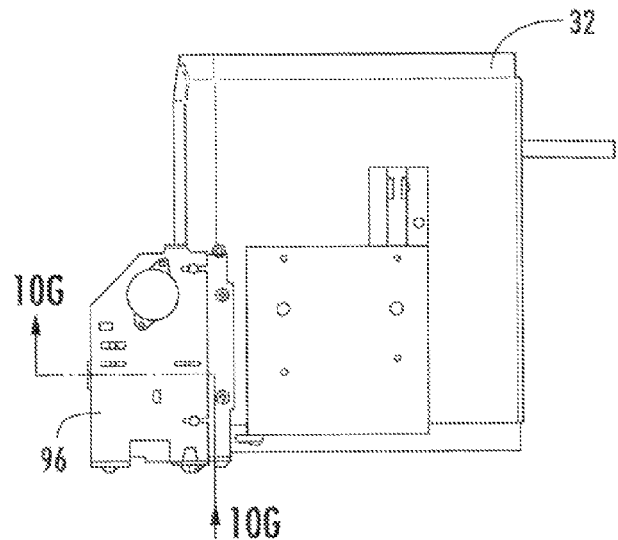
Figure 10G:
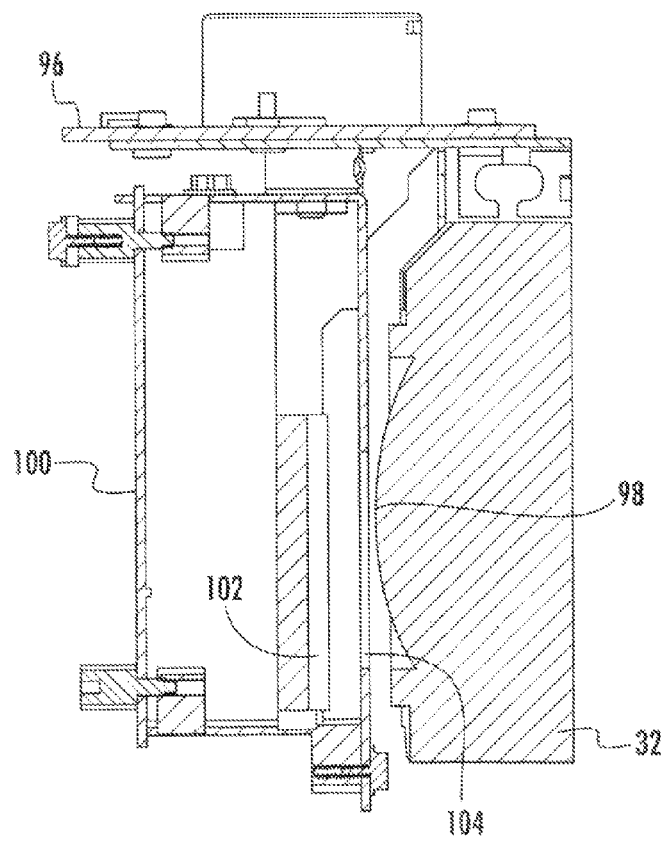
Figure 11A:
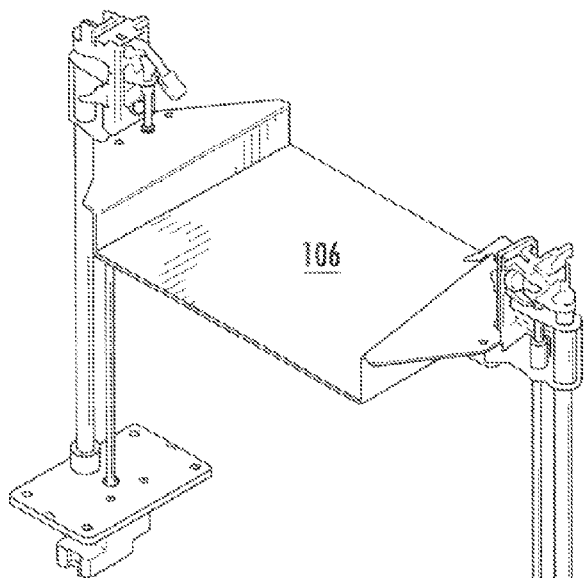
Figure 11B:
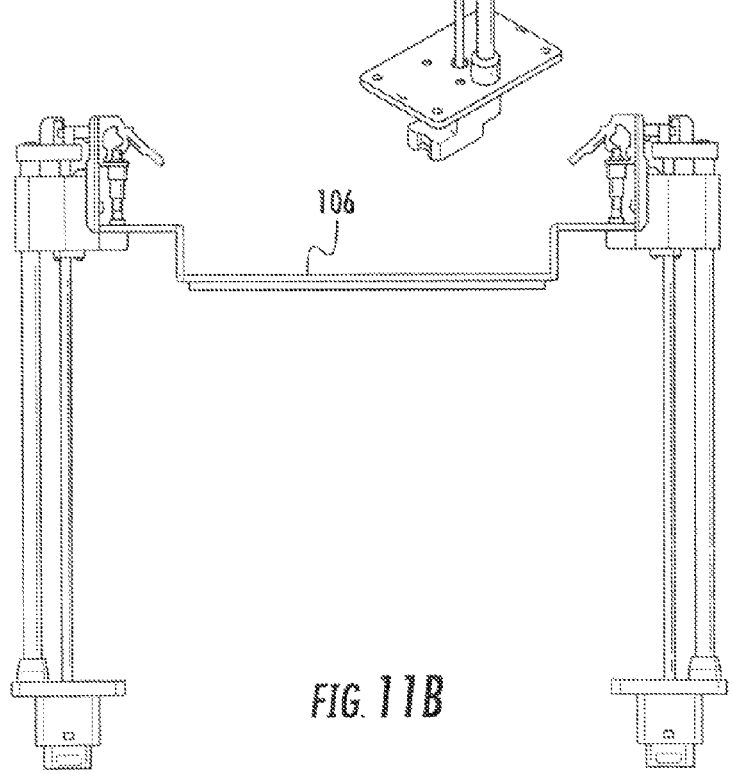

Having thus described the invention in general terms, reference will now be made to the accompanying drawings, which are not necessarily drawn to scale and are meant to be illustrative and not limiting, and wherein:

FIG. 1 is a perspective view of a solid imaging apparatus in accordance with one embodiment of the present invention, illustrating the front door through which an operator is able to access the build chamber;

FIG. 2 is a perspective view of the solid imaging apparatus of FIG. 1 with certain exterior walls removed to show the internal components of the solid imaging apparatus, including the cartridge, tray, coater bar, build platform, shuttle, imager, and other components;

FIG. 3A is a perspective view of certain portions of the solid imaging apparatus of FIGS. 1 and 2 illustrating the frame into which the tray is positioned and illustrating the cartridge and shuttle, wherein the shuttle is in the open position;

FIG. 3B is another perspective view of the same portions of FIG. 3A but viewed from under the frame, wherein the shuttle is shown in the closed position;

FIG. 4 is a perspective view of certain portions of the solid imaging apparatus of FIGS. 1 and 2 illustrating the cartridge being inserted into (or being removed from) the slot that holds the cartridge during operation of the solid imaging apparatus;

FIG. 5A is a perspective view of the cartridge of FIGS. 1-4 illustrating two selectively openable valves extending from the bottom wall of the cartridge;

FIG. 5B is a front elevational view of the cartridge of FIGS. 1-4 illustrating two selectively openable valves extending from the bottom wall of the cartridge;

FIG. 5C is a side elevational view of the cartridge of FIGS. 5A and 5B;

FIG. 5D is a front elevational view of the cartridge of FIG. 5C showing the interior of the cartridge and illustrating the two mixing balls in the cartridge and the spring in each selectively openable valve to prevent the balls from becoming lodged in a valve;

FIG. 5E is an enlarged perspective view of the cartridge of FIGS. 5A-5D shown in its position within the solid imaging apparatus relative to the shuttle and the portion of the frame that the shuttle moves along, wherein the valve opening devices are not in contact with the selectively openable valves;

FIG. 5F is an enlarged perspective view similar to FIG. 5E but showing the shuttle moved to a different location such that the valve opening devices are not contact with the selectively openable valves to cause solid imaging material to dispense from the cartridge;

FIG. 5G is a front elevational view of the cartridge above the frame;

FIG. 5H is a side elevational cross-section view of the valve opening device in a position where it applies a force to the side of the selectively openable valve;

FIG. 5I is a side elevational view of the cartridge above the frame;

FIG. 5J is a top cross-section view of the valve opening device in the position where it applies a force to the side of the selectively openable valve;

FIG. 6A is a perspective view of the tray of the solid imaging apparatus of FIGS. 1-3B, illustrating the adhesion of the film to an upper surface of the tray bottom edge, wherein at least one of the film surface and the upper surface of the tray bottom edge is textured to increase adhesion of the film to the tray bottom edge:

FIG. 6B is a side elevational view of the tray of FIG. 6A, illustrating the filter area of the tray and the adhesion of the film to an upper surface of the tray bottom edge;

FIG. 6C is an enlarged view of a portion of FIG. 6B, illustrating in more detail the filter area of the tray and the adhesion of the film to an upper surface of the tray bottom edge;

FIG. 6D is a top plan view of the tray of FIG. 6A;

FIG. 6E is a side elevational view of the tray of FIG. 6A;

FIG. 7 is a perspective view of the frame with a gasket where the tray of the solid imaging apparatus of FIGS. 1-3B is positioned, wherein the gasket provides a seal between the bottom outside surface of the tray and the support surface of the frame of the solid imaging apparatus, and illustrating the passage for the supply and removal of air from between the bottom of the tray and the support surface of the frame;

FIG. 8A is a front elevational view of the cartridge in the cartridge slot and of the frame of the solid imaging apparatus of FIGS. 1-3B illustrating the air supply to provide positive air pressure and negative air pressure to the passage shown in FIG. 7;

FIG. 8B is a side elevational cross-section view of the frame, tray, and coater bar of the solid imaging apparatus of FIGS. 1-3B, illustrating the coater bar in the position prior to the first movement to scrape or push uncured solid imaging material of a previous layer toward the filter portion of the tray;

FIG. 8C is a detailed side elevational cross-section view of the passage for the supply and removal of air from between the bottom of the tray and the support surface of the frame;

FIG. 8D is a detailed side elevational cross-section view of the filter portion of the tray;

FIG. 9A is a top perspective view of the coater bar of the solid imaging apparatus of FIGS. 1-3B illustrating the scraping edge. (also referred to herein as a first scraping edge) and illustrating the upper recesses on the upper portion of the coater bar that permit solid imaging material to generally flow over the coater bar prior to the second movement of providing a layer of solid imaging material on the film of the tray, wherein the upper recesses are separated by a plurality of connection portions that define at least two connection positions;

FIG. 9B is a top perspective view of the coater bar of FIG. 9A illustrating the layering edge (also referred to herein as a second layer edge) and illustrating the upper recesses on the upper portion of the coater bar that permit solid imaging material to generally flow over the coater bar prior to the second movement of providing a layer of solid imaging material on the film of the tray, wherein the upper recesses are separated by a plurality of connection portions that define at least two connection positions:

FIG. 9C is a side elevational view of the coater bar of FIG. 9A illustrating the scraping edge on the right lower side of the coater bar and the layering edge on the left lower side of the coater bar and illustrating the connection portion on the upper side of the coater bar, wherein the connection portion defines a wedge-slot comprising two surfaces that are generally at an angle to the other;

FIG. 9D is a side elevational view of the coater bar of FIG. 9A upside down illustrating the plurality of tabs extending generally orthogonal to the second layering edge;

FIG. 9E is a top plan view of the coater bar of FIG. 9A illustrating the connection portions and the upper recesses therebetween;

FIG. 9F is a side elevational view of the coater bar similar to FIG. 9C;

FIG. 9G is a side elevational view of the coater bar of FIG. 9A upside down illustrating the first scraping edge;

FIG. 10A is a top plan view of the imager of the solid imaging apparatus of FIGS. 1-3B illustrating the shutter in the open position, wherein the shutter is connected to the imager by a porch;

FIG. 10B is a front elevational view of the imager of FIG. 10A illustrating the shutter in the open position;

FIG. 10C is a top plan view of the imager of FIG. 10A illustrating the shutter in the closed position;

FIG. 10D is a front elevational view of the imager of FIG. 10C illustrating the shutter in the closed position;

FIG. 10E is a side elevational view of the imager of FIG. 10A illustrating the shutter in the open position and projecting an image that is reflected by a mirror (not shown) onto the image plane (not shown);

FIG. 10F is a top plan view of the imager similar to FIG. 10C illustrating the shutter in the closed position;

FIG. 10G is a detailed side elevational view of the imager of FIG. 10F illustrating the shutter in the closed position over the lens of the imager and illustrating the diffuser and actinic radiation sensor that are connected to the shutter for measuring the intensity of actinic radiation projected by the imager;

FIG. 11A is an perspective view of the build platform of the solid imaging apparatus of FIGS. 1-3B, and illustrating the motor driven screws and guides for moving the build platform vertically (along the z-axis); and FIG. 11B is a side elevational view of the build platform of FIG. 11A illustrating the build pad attached to the build platform.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for creating three-dimensional objects are described and shown in the accompanying drawings with regard to specific types of solid imaging apparatus and components thereof, it is envisioned that the functionality of the various apparatus and methods may be applied to any now known or hereafter devised solid imaging apparatus for making three-dimensional objects based upon computer or digital data representing the object to be made. Like numbers refer to like elements throughout.

With reference to FIGS. 1-11B, a solid imaging apparatus in accordance with one embodiment of the present invention is illustrated. Although the figures are for a single embodiment of a solid imaging apparatus, the present invention encompass additional solid imaging apparatus having more, fewer, and alternative components, as well as similar components of different design as described herein.

FIG. 1 shows a solid imaging apparatus 10 of one embodiment of the present invention illustrating the front door 12 through which an operator is able to access the build chamber inside the solid imaging apparatus. FIG. 2 shows the solid imaging apparatus 10 with most of the external walls removed in order to better illustrate the build chamber 14. A cartridge 16 includes a supply of solid imaging material (not shown) that can be selectively dispensed into a tray 18 of the solid imaging apparatus. The tray 18 holds the solid imaging material used to build the three-dimensional object (not shown) during the build process. The solid imaging material can be any photocurable material known in the art or devised hereafter. Examples of photocurable materials suitable for use with various embodiments of the present invention include the photocurable materials described in U.S. Pat. No. 7,358,283 and U.S. Patent Application Publication No. 2010/0056661. The solid imaging material is dispensed from the cartridge 16 through one or more selectively openable valves 20 on a bottom wall of the cartridge. One or more valve-opening devices 22, preferably one valve-opening device for each selectively openable valve (any combination of opening devices and valves may be used depending upon their relative shapes), provide a force to the side of the selectively openable valve 20 to allow the solid imaging material to dispense from the cartridge 16. The valve-opening devices 22 of FIG. 2 are attached to a shuttle 24 that moves back and forth generally along the x-axis of the solid imaging apparatus 10. By selectively moving the shuttle 24 back along the x-axis, the valve-opening devices 22 apply the force to the side of the selectively openable valves 20. The amount of solid imaging material dispensed from the cartridge into the tray is based upon the duration that the valve-opening devices 22 apply the force to the selectively openable valves 20, as discussed more fully below. The shuttle 24 of FIG. 2 includes at least one opening proximate the valve-opening devices to permit the dispensed solid imaging material to pass through the shuttle and into the tray. Further embodiments of the present invention include alternative devices for dispensing solid imaging material into the tray.

A coating bar 26 is connected to the shuttle 24, such as on the bottom of the shuttle, opposite the valve-opening devices 22, as shown in FIG. 2. The coating bar 26 is also moved generally along the x-axis when the shuttle is moved by the shuttle motor 28 via the shuttle linkage 30. The coating bar, as explained more fully below, scrapes or removes uncured solid imaging material, as well as particles of cured material that are not connected to the three-dimensional object, left from a previously imaged or cured layer by moving the coating bar in a first movement that is in the x-axis direction. The coating bar 26 includes a connection portion that allows its position, relative to the shuttle 24 and tray 18, to be changed so that when the coating bar is moved back in a second movement, it coats the bottom surface of the tray (it applies a new layer of solid imaging material). Moving the coating bar 26 in the second movement not only applies a new layer of solid imaging material, but it also controls the thickness of the layer and smooths the surface of the layer. This new layer of solid imaging material is selectively cured by an image (not shown) projected by the imager 32 to form one cross-sectional layer of the three-dimensional object being built. The image projected by the imager 32 is reflected off a mirror 34 and exposed through a supporting surface of the frame 36 that is under the tray 18. The bottom surface of the tray 18 comprises a radiation-transparent film through which the image is projected so that the solid imaging material on the tray is selectively cured by the projected image.

The three-dimensional object is supported by a build pad 34 (see FIGS. 11A and 11B for better detail) connected to the bottom surface of build platform. The new layer of solid imaging material is selectively cured after the build pad and/or the previously cured layer of the three-dimensional object is lowered to be in contact with the new layer so that the new cured layer is adhered to the previously cured layer as is commonly understood in the additive manufacturing arts. Some embodiments of the present invention include a textured surface to improve the adhesion of the first layer of cured material to the build pad. In some embodiments the build pad includes a sheet of KYDEX® thermoplastic available from Kydex, LLC of Bloomsburg, Pa. After a layer is selectively cured, the build platform moves up (vertically along the z-axis) to raise at least that most recently cured layer above the height of the coating bar 26, the shuttle 24, and the valve-opening device 22 so that none of the moving parts of the solid imaging apparatus 10 contact the three-dimensional object, which could damage the three-dimensional object and cause the build to fail.

FIGS. 3A and 3B illustrate the frame 36 of the solid imaging apparatus 10 of FIGS. 1 and 2. It should be appreciated that the solid imaging apparatus 10 include other portions of the frame to define the entire frame of the machine; however, the illustrated portion of the frame is discusses as many of the most important features of the solid imaging apparatus are connected to this portion of the frame that is generally disposed along the x-axis and y-axis. The shuttle 24, shuttle motor 28, tray 18, and the cartridge 16 (via slot 38 discussed more fully below) are all connected to the frame 26. FIG. 4 illustrates the frame 36 and slot 38 in more detail. The slot 38 is shown in the cartridge-loading and cartridge-unloading position, such that it is angled upward to allow the cartridge to be slid in or out of the slot 38. An upper frame portion 40 includes a cartridge opening 42 (that is aligned with an access door (not shown) on the exterior of the solid imaging apparatus 10) through which an operator can pass the cartridge to load it into, or unload out of, the slot 38. Once the cartridge 16 has been fully loaded into the slot 38, as shown in FIG. 4, the operator pivots the left side of the slot down to lock the slot into a generally horizontal position that it remains during the build process of the solid imaging apparatus. The left side of the slot 38 rests upon a load cell 44 that measures the amount of solid imaging material remaining in the cartridge 16, as more fully described below. Both sides of the slot 38 are attached to opposite rails 46 of the frame 36. The shuttle 24 is moved back and forth along the rails 46 to move the coating bar 26 and to move the valve-opening devices 22 against the selectively openable valves 20 of the cartridge 16 during the build process of the solid imaging apparatus. The rails 46 can be raised relative to the frame to permit loading and unloading of tray 18. When an operator lifts the front end of the rails, the shuttle and cartridge are similarly lifted because they are connected to the rails 46. The rails are also connected to lift assists 48 on either side of the rails that enable the rails to stay in an upper position once the operator has raised the rails. The lift assists 48 are support gas cylinders, as known in the mechanical arts; however, lifts assists of further embodiment of the present invention include any device that assist in lifting and keeping up the rails 46 until the operator is ready to lower the rails back to their operating position (generally level and parallel with the frame 36).

FIGS. 5A through 5J provide multiple views of the cartridge 16 and the selectively openable valves 20 on the bottom wall thereof. FIGS. 5A through 5C show the exterior of the cartridge having at least one sidewall (such as the front wall and back wall), a top wall, and a bottom wall and having two selectively openable valves on the bottom wall, a venting cap on the top wall, generally horizontal slots on the front and back walls for receiving tabs of the slot 38 for retaining the cartridge in a preferred position, and generally vertical slot or slots to provide a surface(s) for the operator to grip the cartridge during loading and/or unloading of the cartridge into and/or out of, respectively, the slot. FIG. 5D shows the interior of the cartridge, which is illustrated with three mixing balls 50 that are provided to help the solid imaging material in the cartridge become mixed when the cartridge is shaken by the operator prior to insertion of the cartridge. Similarly, because the solid imaging material of some embodiments of the present invention include some particles that may settle to the bottom or top of the material if the cartridge is not moved for an extended period of time, the solid imaging apparatus may prompt the operator to remove the cartridge and shake it for a certain period of time to ensure that the solid imaging material is properly mixed prior to solid imaging material being dispensed into the tray during a build process. The mixing balls provide improved mixing while the cartridge is shaken at whatever times the operator is instructed to shake the cartridge. To prevent the mixing balls from stopping or limiting the flow of solid imaging material through the selectively openable valves, a valve plug 52 is provided in the interior portion of the selectively openable valves. The valve plug includes passages that are large enough to allow the solid imaging material to flow into the valve but small enough to prevent the mixing balls from stopping or limiting flow through the valve. Further embodiments of the present invention include alternative valve plugs or include alternative selectively openable valves that do not require valve plugs for stopping mixing balls or other items in the cartridge from stopping or limiting flow of solid imaging material through the selectively openable valves. The selectively openable valves of the present invention can be any openable valves known to one skill in the art, including but not limited to silicone valves such as the bite valves available from CamelBack of Petaluma, Calif.

FIGS. 5A and 5D show a recess 54 in the top wall of the molded cartridge 16 that is adapted to receive a radio frequency identification tag (RFID tag) that includes information relating to the solid imaging material in the cartridge. FIG. 5E shows the RFID tag 56 installed in the recess 54. The slot 38 includes an RFID reader 58 (shown in FIG. 4) that can read the information on the RFID tag and/or write information to the RFID tag when the cartridge is loaded into the slot. The RFID tag 58 allows the solid imaging apparatus to identify the type of solid imaging material in the cartridge (to ensure it is consistent with the solid imaging material in the tray and the material intended to be used to make the three-dimensional object), ensure that the material is not expired or subject to a recall or has other conditions requiring a notice or warning to the operator, and assist in determining how much material remains in the cartridge based upon records of the cartridge's manufacture and prior usages.

FIG. 5E shows the cartridge 16 above the shuttle 24 without the slot 38 and without the coating bar 26 to better explain the cartridge and shuttle. As mentioned above, the shuttle 24 includes openings 60 proximate the valve-opening devices 22 that enables the dispensed solid imaging material to pass through the shuttle 24 and into the tray below. The bottom side of the shuttle includes tabs 62 that contact a connection portion of the coating bar, as described more fully below. FIG. 5E shows the shuttle in a partially closed position (when the shuttle is moving either in the first movement or the second movement), and FIG. 5F shows the shuttle in a dispensing position which in the illustrated embodiment is slightly beyond the shuttle open position. The shuttle open position is when the valve-opening devices are proximate the selectively openable valve but not applying a force to the valves sufficient to dispense solid imaging material from the cartridge. The shuttle is in the open position generally whenever the shuttle is not moving the coating bar to scrape/clean a previous layer or to apply/coat a new layer or moving the valve-opening device(s) to apply a force against a side of the selectively openable valve(s), such as when the three-dimensional object has been lowered to contact the new layer of solid imaging material and/or when the new layer of solid imaging material is being selectively cured by the imager. Another instance when the shuttle is in the open position is when the shuttle is stationary in the closed position prior to and during the opening of the door 12 of the solid imaging apparatus 10 in order to prevent outside actinic radiation from unintentionally curing the solid imaging material in the tray 18. The shuttle 24 may be in the open or closed position when the operator lifts the rails 46 in order to replace the tray because the new tray being inserted typically will not include the solid imaging material in it during installation and the removed tray with solid imaging material will likely be discarded.

FIGS. 5F through 5J show different perspectives of the valve-opening device applying a force to the selectively openable valve in order to cause the solid imaging material to dispense from the valve. The selectively openable valve defines an axis that is generally parallel to the z-axis, so that as the valve-opening device moves in the x-axis, it applies a force that is generally orthogonal to the axis of the valve. As shown in FIG. 5D, the valve of some embodiments includes a slit 64 that is generally aligned along the x-axis, so that when the valve-opening device applies a force along the x-axis, the slit is opened up to allow solid imaging material to flow out of the cartridge. The selectively openable valve in these embodiments comprises a "bite valve" of elastomeric material, which are known in the art; however, further embodiments of the present invention include valves (and corresponding valve opening devices) of alternative design that perform the same function of selectively allows solid imaging material to selectively flow from the cartridge into the tray. Further embodiments of the present invention apply a force, along any axis or combination of axes, on the cartridge (such as on a sidewall, the top wall, or the bottom wall) to increase the pressure inside the cartridge a sufficient amount to open the selectively openable valves to dispense solid imaging material. Still further embodiments include an air hose connected to the cartridge to selectively apply air pressure to the inside of the cartridge a sufficient amount to open the selectively openable valves to dispense solid imaging material.

Turning now to the tray of FIGS. 6A through 6E, the tray 18 defines a generally square or rectangular tray comprising a bottom surface and side walls about an inch or less in height. Further embodiments of the present invention include trays that are any shape and size that is suitable for the type of imager, the size of the image plane, or any other parameters. The tray 18 of the illustrated embodiment is a plastic tray, such as a polypropylene tray, with a bottom surface that defines a bottom edge onto which a radiation-transparent film 66 is adhered. The "bottom surface" of various embodiments of the present invention may comprise a large area (in the plane of the x- and y-axes) or a small area, including an area as small as the cross-sectional thickness of the side walls. The film is generally radiation-transparent to the actinic radiation used to cure the solid imaging material. The film also defines a surface that the cured solid imaging material can be easily separated from. The film 66 of the illustrated embodiment is a fluorinated ethylene propylene (FEP) film; however, further embodiments of the present invention include polytetrafluoroethylene (PTFE) film or the like as described more fully in incorporated U.S. Pat. No. 7,614,866. Because the film is generally non-stick, in order to adhere the edges of the film 66 to the bottom edge of the tray 18, the film surface to be adhered and/or the bottom edge surface to be adhered is mechanically and/or chemically textured to provide better adhesion between the film and bottom edge of the tray. Although the illustrated embodiments disclose a film that is adhered to the bottom surface with an adhesive or two-sided tape, such as two-sided tape available from 3M of St. Paul, Minn., further embodiments of the present invention adhere the film and bottom surface and/or side walls using alternative techniques known in the art to adhere two surfaces, including but not limited to ultrasonic welding, mechanical joining (such as with a pinch device or clamp device), injection molding the bottom surface and/or side walls onto the film, using a multilayered, multimaterial film, and the like.

The tray 18 also includes filter portion 68 on an end of the tray opposite the cartridge. Because the solid imaging material may include particles of hardened solid imaging material or other impurities that would adversely affect the quality of the three-dimensional objects being made by the solid imaging apparatus, the tray 18 has filter portion 68 through which uncured solid imaging material from previously cured layers and new solid imaging material dispensed from the cartridge 16 are passed through the filter portion 68 to collect undesirable particles outside of the imaging area. During operation of the solid imaging apparatus, the newly dispensed solid imaging material is dispensed prior to the first movement of the coating bar so that the newly dispensed material travels with the scraped/moved uncured solid imaging material from the previous layer so that the materials are mixed/combined. The coating bar 26 travels until the coating bar contacts the filter wall 70 causing the mixed/combined solid imaging material to flow over the filter wall and through the filter portion 68 and out filter exit 72 so that the filtered solid imaging material is proximate the leading edge of the coating bar as the coating bar is moved in the second movement to apply/form the new layer of solid imaging material on the bottom film of the tray, as discussed more fully below.

FIG. 7 shows the frame 36 with gasket 74 in the recess for receiving the tray 18. To prevent vapor lock between the recess and tray, either one or both include features, such as ribs or recesses to permit the removal of the tray from the recess. The rails 46 (not shown in FIG. 7), keep the tray 18 in the recess during operation of the solid imaging apparatus. The recess includes a radiation-transparent support surface 76, such as glass or plastic material that generally allows the desired wavelength of actinic radiation for curing the solid imaging material to pass through the support surface. The air passage 78 is also shown in FIG. 7, to which the air hose 80 is attached to supply the positive and negative air pressures discussed below. The positive and negative air pressures may be provided by any technique known in the art including, but not limited to a diaphragm pump connected to a DC motor, a peristaltic pump, a centrifugal pump, and the like.

To assist the film 66 of tray 18 in separating from the cured layer of solid imaging material connected to the three-dimensional object supported by the build pad on the build platform, a positive air pressure is applied through hose 80 to passage 78 prior to, simultaneously with, and/or immediately after the build platform is vertically raised (along the z-axis) to allow the flexible film to more easily separate from the cured layer in the same or similar fashion to what is disclosed in the prior art patents incorporated by reference. The gasket 74 provides a generally air tight seal to ensure that no or minimal air is allowed to escape or enter between the film 66 and the support surface 76 to provide better control of the film position to thereby provide better separation of the film from the cured layer. The gasket 74 of the illustrated embodiment includes a single strip of gasket material (any suitable material known in the art) along three edges of the tray and includes two strips of gasket material on the edge of the tray proximate the passage 78 to ensure an adequate seal while providing some clearance for the tray position within the recess of the frame 36. Alternative gasket patterns are included in the present invention to ensure adequate sealing and providing ease of installation of the tray (which will be installed by the operator). The gasket of some embodiments of the present invention also prevents any solid imaging material that might unintentionally spill out of the tray from flowing between the film of the tray and the support surface, which could undesirably limit the flow of air between the film of the tray and the support surface and/or block the actinic radiation projected from the imager.

FIGS. 8A through 8D illustrate the operation of the solid imaging apparatus that includes the tray 18 and coating bar 26 installed. FIG. 8B shows the coating bar 26 connected to the tabs 62 of the shuttle (not shown in FIG. 88B) in the position the coating bar would be located during the curing of the layer of solid imaging material and/or during the dispensing of the solid imaging material from the cartridge. FIG. 8C shows in detail the air hose 80 connection to the air passage 78 that is positioned below the film 66 of the tray 18. FIG. 8D is a detailed view of the filter portion 68 and surrounding area of the tray 18. Although not shown in the figures, the coating bar assists in removing the air from between the film 66 and the support surface 76 because after the cured layer has been separated from the top surface of film 66 and lifted a safe distance to clear the shutter 24 and its connected components, a negative air pressure (which, like the positive air pressure through hose 80 can be supplied by a simple air pump with valves or any other devices for providing positive and negative air pressure) is applied to passage 78 so that the air between film 66 and support surface 76 is removed to ensure that film 66 lays flat on the support surface 76. The coating bar, during both the first movement of scraping uncured solid imaging material and the second movement of applying a layer of solid imaging material, pushes any trapped air bubbles between the film and support surface, thereby assisting in the removal of air. The shuttle is preferably, though not required to be, connected to the coating bar with a spring device or other device that applies a downward force on the coating bar to improve the scraping/cleaning of uncured solid imaging material and to help determine and/or maintain the gap distance that sets, in part, the layer thickness of the newly applied layer of solid imaging material. The downward force also assists in removing air bubbles from between the film and support surface.

Turning now to the coating bar 26 of FIGS. 9A through 9G, the coating bar generally extends along the y-axis and on a lower edge (in the z-axis) the coating bar comprises a first scraping edge 82 extending generally along the y-axis and a second layering edge 84 also extending generally along the y-axis. The second layering edge 84 does not actually contact the film 66 of tray 18 when it defines the lowermost portion of the layer bar; instead the plurality of tabs 86 contacts the film upstream of the second layering edge. The plurality of tabs 86 extend generally along the x-axis (orthogonally to the first scraping edge and second layering edge) and are spaced apart along the y-axis length of the coating bar 26. A gap between the bottom of second layering edge 84 and the bottom of the plurality of tabs 86 controls, in part, the thickness of the layer of solid imaging material applied during the second movement of the coating bar. Other parameters that control the thickness of the layer include, but are not limited to the speed of movement of the coating bar, the viscosity or other properties of the solid imaging material, and other process or material parameters. The first movement of the coating bar has the plurality of tabs 86 on the trailing edge (on the side generally free of solid imaging material that has been scraped/cleaned by the first scraping edge. The second movement of the coating bar has the plurality of tabs on the leading edge and generally surrounded by solid imaging material being pushed by the second layering edge so that the solid imaging material passes around the plurality of tabs and under the second layering edge to form the new layer of solid imaging material. The cross-sectional shape of the plurality of tabs is generally rectangular with a relatively narrow width along the y-axis, so that the solid imaging material is able to fill any wake left behind the moving bottom surface of the plurality of tabs so that there are no streaks, gaps, or other points without solid imaging material in the new layer applied by the second layering edge. Further embodiments of the present invention include alternative shapes for the plurality of tabs to minimize or prevent the presence of discontinuities in the applied layer of solid imaging material. The shape and size (particularly the thickness along the y-axis) of the tabs are generally dependent upon the viscosity of the solid imaging material, such that the higher viscosity the material, the thinner the tabs profile should be along the x-axis to prevent the formation of wakes (areas in the layer with no solid imaging material).

During the first movement of the coating bar, the first scraping edge contacts the upper surface of the film 66 generally along the entire y-axis width of the imaging area of the film and generally along the entire x-axis distance of travel of the coating bar. As previously mentioned, the first movement of the coating bar preferably continues until the coating bar contacts the filter wall 70 proximate the front end of the tray. By contacting the filter wall, the coating bar not only forces the pushed material (both the scraped uncured material of the previous layer and the newly deposited material from the cartridge) over the filter wall and into the filter portion 68, but the coating bar causes the tab 62 to move within the connection portion 88 of the recoater bar to pivot the coating bar from the first scraping position (in which the first scraping edge is contacting the film surface, as shown in FIG. 88 prior to the first movement) to the second layering position (in which the plurality of tabs contact the film surface and the second layering edge is positioned just above the film surface). The coating bar of FIGS. 9A through 9G include a plurality of connection portions 88 that define a wedge-slot that comprises two surface that are generally at an angle to one another, as best shown in FIG. 9C. The tabs 62 of shuttle 24 contact surface 90 of connection portion 88 during the second movement to push the plurality of tabs 86 against the film 66 surface and raise the second layering edge to provide the gap for which solid imaging material can flow under to define the new layer of solid imaging material. Alternately, the tabs 62 of shuttle 24 contact surface 92 of connection portion 88 during the first movement to push the first scraping edge against the film 66 surface to cause the uncured solid imaging material to be pushed by the coating bar to the filter portion 68 of tray 18.

Between the connection portions 88 of coating bar 26 are provided upper recesses 94 that are sized to allow some solid imaging material to flow over the upper recesses during the first movement and/or as the coating bar is positioned against filter wall 70 so that the solid imaging material is available in front of the second layer edge in order to be applied as the new layer of solid imaging material during the second movement. Any material that flows through the upper recesses does not have particles filtered out; however, by allowing some material to bypass the filter portion, the speed of the build process can be reduced and/or the build process can continue even if the filter portion becomes partially or fully blocked with filtered particles. The filtered particles are typically small pieces of cured solid imaging material that were either unintentionally cured, such as by scattered actinic radiation or outside actinic radiation, or were pieces of the three-dimensional object that unintentionally detached from the object. Regardless of how the pieces of cured solid imaging material were created, certain embodiments of the present invention filter them out of the solid imaging material and retain them in the filter portion 68 until the tray 18 is replaced in order to prevent such pieces from becoming part of the three-dimensional object and possibly diminishing the quality of the three-dimensional object, particularly if the piece is integrated into the outer edges of the three-dimensional object.

Alternative embodiments of the present invention include coating bars have two separate portions that provide a first scraping edge and a second layering edge, such that one is raised relative to the other during the respective movement. However, by combining both scraping and layering/coating into a single coating bar, the present invention provides an effective, reasonably priced solution for providing layers of solid imaging material in a tray of a solid imaging apparatus. Prior art solid imaging apparatus with tray type devices typically do not include any coating bar or other scraping and layering device because those apparatus typically provide an amount of material well above a layer thickness. However, such conventional solid imaging apparatus create parts with additional uncured solid imaging material on the side walls of previously cured parts which can lead to diminished side wall accuracy and/or waste of build material that must be cleaned off during post processing.

Certain embodiments of the present invention also include a sensor, similar in appearance to the passage 78 and positioned under the film 66, to send an optical or other signal through the film and solid imaging material and off a reflector (not shown) positioned on the bottom of the slot 38 and back to the sensor (for embodiments where the sensor is positioned below slot 38). Based upon the intensity of the received signal relative to the transmitted signal, the sensor output can be converted to a measurement of the amount of solid imaging material in the tray 18. This measurement is used by the controller of the solid imaging apparatus 10 to calculate the amount of solid imaging material needed to be dispensed into the tray from the cartridge 16. The amount of material needed is converted into a duration for applying a force to the selectively openable valves 20 by the valve-opening devices 22 (the distance that the valve-opening devices can also be controlled and/or accounted for in the calculations because opening the valves a greater extent for a shorter period of time (or vice versa) could provide the amount of solid imaging material needed). Because the head pressure in the cartridge can change the flow rate of the solid imaging material out of the cartridge, the amount of material in the cartridge is determined by the measurements taken by the load cell 44 (or any other device that can be used to measure the amount of solid imaging material in the cartridge) and included in the calculation to determine the duration that the valve-opening devices 22 apply a force to the selectively openable valves 20. Moreover, various embodiments of the present invention calculate the amount of dispensed material required based upon the pattern of the cured solid imaging material of the previous layer to replace the cured amount of material. Still further embodiments combine the real-time measurements of solid imaging material with theoretical calculations based upon part geometry (the cross-sectional area of cured material) to determine the amount of solid imaging material to dispense.

Measurements of the amount of material in the tray 18 can be performed at any time during the layer forming process, such as prior to the first movement, prior to the second movement, and/or subsequent to the second movement. The sensor(s) can also be used to determine if an inadequate amount of solid imaging material was applied to thereby dispense additional material and repeat the first and second movements prior to lowering the previously cured layers of the three-dimensional object into the new layer of material and selectively curing the new layer of material.

Turning now to FIGS. 10A-10G, the imager 32 of certain embodiments of the present invention includes a porch 96 mounted near or around the lens 98 of the imager. A shutter 100 is rotatably connected to the porch 96 by a motorized hinge or similar device. The shutter 100 includes an imager sensor 102 mounted on a side of the shutter that faces the lens 98 when the shutter is in the closed position. Because some sensors 102 can be flooded by the direct actinic radiation projected by the imager 32, causing reductions in measurement accuracy, the shutter 100 of the illustrated embodiment includes a diffuser 102 positioned above the sensor so that actinic radiation projected by the imager is diffused prior to being measured by the sensor. The solid imaging apparatus can undergo an automatic calibration process to determine the intensity of actinic radiation of any point or group of points (pixels or group of pixels) in the image. This process is typically performed prior to the first build process (during manufacturing and/or at the customer location) and can also be performed at various times during the life of operation of the solid imaging apparatus. The process is typically performed between build processes (in other words, when a three-dimensional object is not being built); however, it is possible to pause a build process and perform the calibration procedure and then resume the build process.

To determine the intensity profile of the projected image, the shutter is moved from the open position to the closed position. The imager then projects a predetermined sequence of projections of actinic radiation at known locations and the measurements from the sensor (or sensors in certain embodiments) are correlated to the locations of the projections to determine relative intensities throughout the projected image. This map of intensity profiles is then used by the controller of the solid imaging apparatus (or by a separate controller used in conjunction with the solid imaging apparatus) to adjust the levels of radiation projected by the various points or pixels in the imager to ensure that the corresponding points or pixel locations in the layers of solid imaging material receive the desired amount of actinic radiation (such as the critical energy for photopolymerization and/or to impart desired mechanical and/or chemical properties to the solid imaging material). Various techniques for providing the desire amount of actinic radiation, such as by gray-scaling and/or projecting multiple patterns per layer, are disclosed in the patents incorporated by reference in their entirety herein.

Turning now to the embodiments of FIGS. 11A and 11B, the build platform 106 is of the type disclosed in the prior art patents incorporated by reference herein, including but not limited to U.S. Pat. No. 7,614,866. A build pad 108 is removably connected to the bottom of the build platform for supporting the three-dimensional object to be made, either through intermediate support structures made by the solid imaging material or directly by contact with the three-dimensional object. The build pad of the illustrated embodiment includes a sheet of KYDEX®brand thermoplastic acrylic-polyvinyl chloride alloy adhered to a layer of foam or other resilient material. The build pads of further embodiments can be made of alternative materials that provide an adequate surface for adhering to the layers of cured solid imaging material and that allow that layer to flex during the first few layers of build in the event the build pad is not perfectly level with the film of the tray and/or the support surface below the film of the tray. By providing a certain amount of resiliency, the build pad does not need to be precisely positioned parallel to the support surface because during the first and subsequent layers, any out of parallel portion will simply penetrate below the standard position at the layer height and then compress when the bottom surface of the build pad contacts the film of the tray. Because the solid imaging material is displaced in the out-of-level area, no solid imaging material will be cured; however, such material would have likely been support structure. The process is continued for each layer until the build pad no longer contacts the film and the solid imaging material begins to be cured. Typically, the out-of-level area is compensated for prior to completion of the support structure so that any discrepancies in the build process are limited to the support structures (which are typically discarded after the build process) and therefore do not adversely impact the quality of the three-dimensional object. Still further embodiments of the present invention compensate for out-of-level build pads by alternative techniques such as by controlling the z-axis motors or other techniques.

The embodiments of the present invention described above generally relate to solid imaging apparatuses with DLP imagers. However, further embodiments of the present invention include alternative imagers based upon plasma screen technology. DLP imagers pose a number of problems such as high cost and requirements to change bulbs or other components relatively frequently. Moreover, many DLP imagers for solid imaging must be specially designed leading to even further costs and logistical issues. DLP imagers also have radiation intensity variations and geocalibration issues based upon the light source and/or the path and optics used to project the image from the imager to the image plane. Many of the problems associated with such DLP and similar imagers are solved or avoided by the plasma screen based imagers of certain embodiments of the present invention. Liquid crystal display (LCD) imagers are also included in other embodiments of the present invention; however, because most solid imaging material used at present are cured with actinic radiation in the UV range and current LCDs are not optimal for providing UV light, this disclosure will focus on plasma screens; however, it should be appreciated that alternative embodiments of the present invention can use similar techniques for improving upon LCD imagers to provide the desired actinic radiation (not necessarily UV light by providing solid imaging materials that photopolymerize at different wavelengths) and use the LCD imagers in the same manner as disclosed herein with plasma screen imagers.

Current plasma screens do produce UV light that can be used to photopolymerize common solid imaging materials; however, filters are currently added to plasma screens to eliminate exposure to UV light wavelengths. Embodiments of the present invention use the plasma screen as a light engine by eliminating the UV filters currently provided on plasma screens. Instead of filtering out the UV wavelengths, the present invention actually want to use UV radiation for imaging purposes. Instead of developing optics for a light engine and then projecting that image via mechanical tolerances as in the prior art, the present invention allows three-dimensional objects to be built directly on the plasma screen or on a film, or film tray of the type disclosed above, placed directly on the plasma screen which has been modified to project UV light. Similarly, further embodiments of the present invention include plasma screens that project other actinic radiation that is paired to the particular photoinitiator(s) of the solid imaging material to selectively cure the solid imaging material in a similar fashion.

Current plasma screens have individual pixels doped to produce red, green, or blue, which televisions use to reproduce images for viewers. The present invention includes embodiments that include plasma screens with pixels that are custom doped to produce specific wavelengths which the solid imaging material could be made to respond to in different manners. In some embodiments, one pixel or collection of pixels could produce a first wavelength which cures solid imaging material to define the three-dimensional object and a second wavelength which cures the solid imaging material to define a support structure for the three-dimensional object. After the build process is complete, the support structure could be washed away or removed by other post-processing techniques. These embodiments of the present invention provide different chemical and/or mechanical properties to the cured solid imaging material based upon the particular wavelength of actinic radiation that is absorbed by the solid imaging material, and those differences in chemical and/or mechanical properties can be used to improve the removal of the support structure and/or improve surface flaws which might otherwise occur when the support structure has the same chemical and/or mechanical properties as the three-dimensional object. Other similar embodiments of the present invention cure the solid imaging material with different wavelengths to provide different chemical and/or mechanical properties for different portions of the three-dimensional object, such as by providing some portions with rigid properties and other portions with elastomeric properties. Still further embodiments of the present invention combine the above techniques to provide still further combinations of chemical and/or mechanical properties to cured solid imaging material.

Further embodiments of the present invention include plasma screens that have all the pixels doped for the same wavelength to significantly improve the image resolution compared to standard plasma screens that are divided into spaces of red, green, and blue thus diluting the pixel resolution by at least one third. Still further embodiments make additional customization to the pixels of the plasma screen to reduce variability, improve image quality, and lower product cost.

Plasma screen imagers of the type described above can be used in the solid imaging apparatus described above by simply removing the imager (and its associated shutter and mirror) and placing the plasma screen imager directly beneath the support surface. Further embodiments of the present invention remove the support surface as well and use the actual surface of the plasma screen imager as the support surface onto which the film of the tray is placed.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims, it is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of three-dimensional objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A solid imaging apparatus for making a three-dimensional object from solid imaging material, the solid imaging apparatus comprising:
    a cartridge including a supply of solid imaging material;
    a tray that holds solid imaging material dispensed from the cartridge;
    a coater bar for applying the dispensed solid imaging material on the tray;
    a moving portion connected to the coater bar to selectively move the coater bar along an x-axis within the solid imaging apparatus; and
    an imager that projects actinic radiation onto a layer of solid imaging material in the tray to selectively cure the layer of solid imaging material,
    wherein the coater bar comprises:
        a first scraping edge extending generally along a y-axis within the solid imaging apparatus;
        a second layering edge extending generally along the y-axis within the solid imaging apparatus; and
        a connection portion adapted to connect the coater bar with the moving portion, wherein the connection portion defines at least two connection positions for connecting the coater bar to the moving portion, and wherein a first connection position causes the first scraping edge to be the lowermost portion of the coater bar and the second connection position causes the second layering edge to be the lowermost portion of the coater bar.

2. A solid imaging apparatus according to claim 1, wherein the first scraping edge defines a doctor blade edge.

3. A solid imaging apparatus according to claim 1, wherein the second layering edge comprising a plurality of tabs extending generally orthogonal to the second layering edge.

4. A solid imaging apparatus according to claim 3, wherein the plurality of tabs are positioned on the leading edge of the coater bar when the coater bar is in the second connection position.

5. A solid imaging apparatus according to claim 4, wherein a trailing edge of the coater bar in the second connection position defines a gap between the portion of the second layering edge extending generally along the y-axis and a bottom of the plurality of tabs extending generally orthogonal to the second layering edge.

6. A solid imaging apparatus according to claim 5, wherein the plurality of tabs define a geometry, as viewed along the z-axis, adapted to reduce disturbances in the solid imaging material that the tabs contact during movement of the coater bar.

7. A solid imaging apparatus according to claim 1, wherein the connection portion defines a wedge-slot extending along the y-axis and comprising two surfaces that are generally at an angle to the other.

8. A coater bar for use in a solid imaging apparatus having at least one moving portion therein, the coater bar comprising:
  a first scraping edge extending generally along a y-axis within the solid imaging apparatus;
  a second layering edge extending generally along the y-axis within the solid imaging apparatus; and
  a connection portion adapted to connect the coater bar with the moving portion, wherein the connection portion defines at least two connection positions, and wherein a first connection position causes the first scraping edge to be the lowermost portion of the coater bar and the second connection position causes the second layering edge to be the lowermost portion of the coater bar.

9. A coater bar according to claim 8, wherein the first scraping edge defines a doctor blade edge.

10. A coater bar according to claim 8, wherein the second layering edge comprising a plurality of tabs extending generally orthogonal to the second layering edge.

11. A coater bar according to claim 10, wherein a trailing edge of the coater bar in the second connection position defines a gap between the portion of the second layering edge extending generally along the y-axis and a bottom of the plurality of tabs extending generally orthogonal to the second layering edge.

12. A coater bar according to claim 8, wherein the connection portion defines a wedge-slot extending along the y-axis and comprising two surfaces that are generally at an angle to the other.

\* \* \* \* \*